INVENTOR
Jacob S. Kamborian
BY Albert Gordon ATT'Y

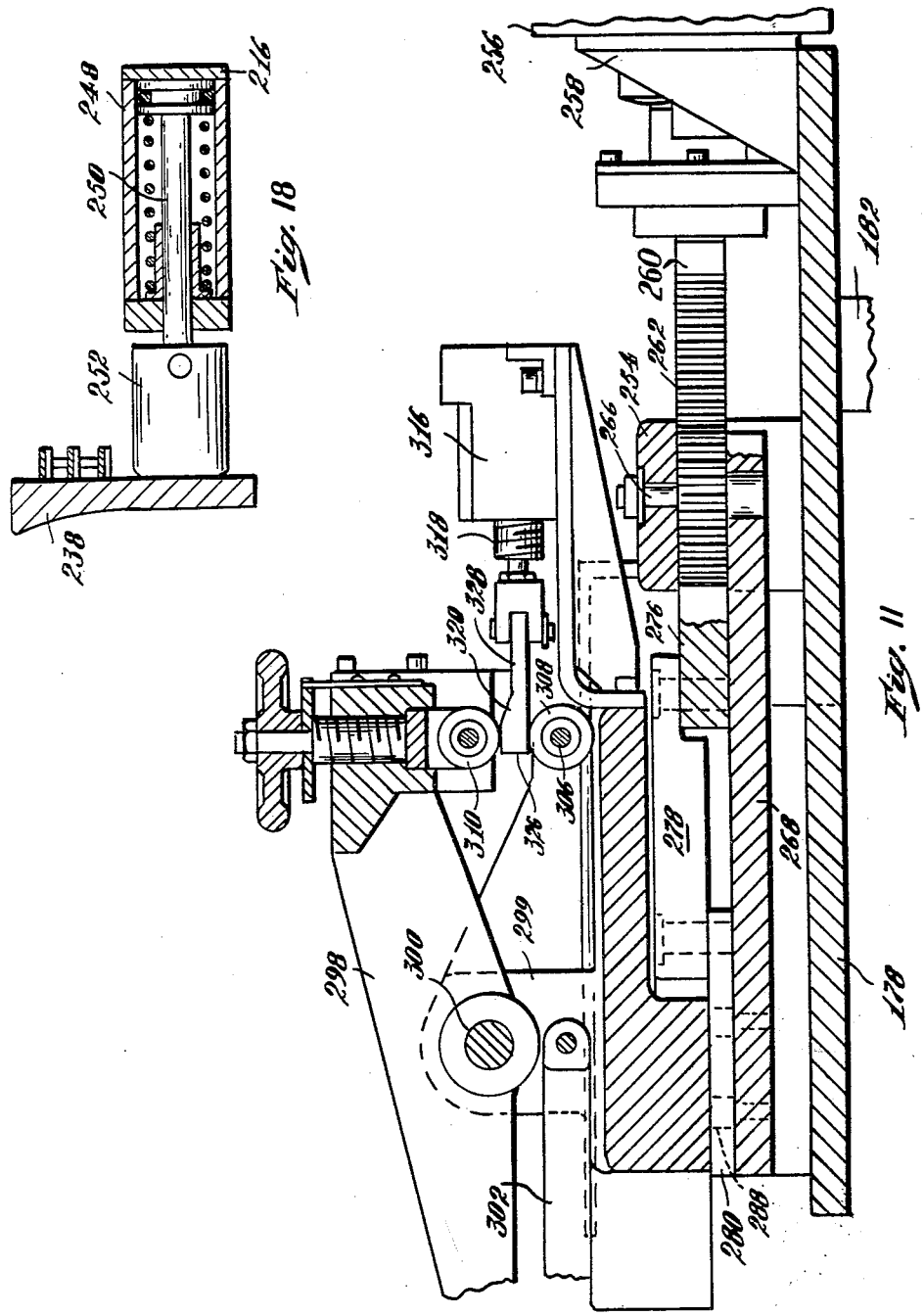

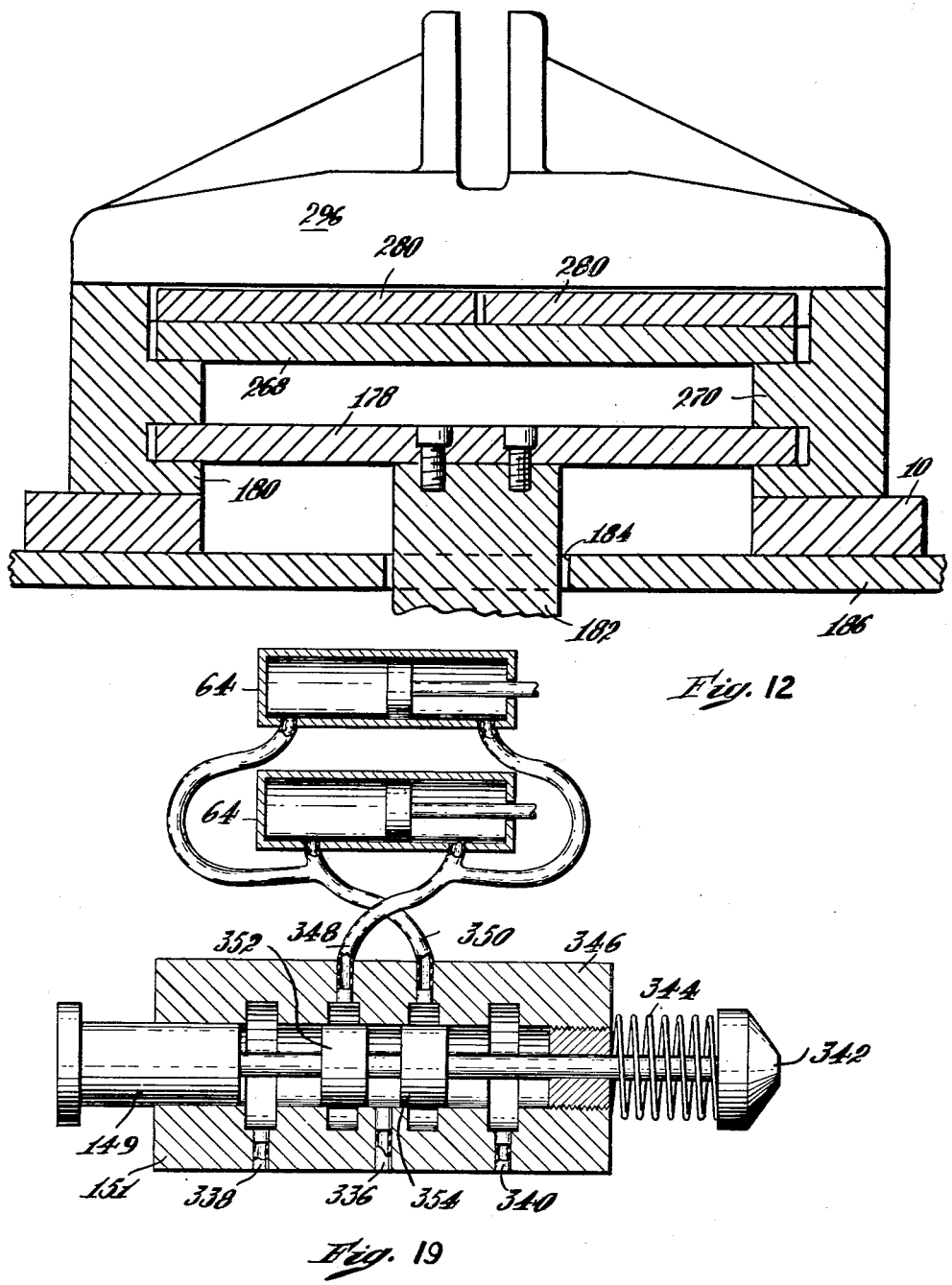

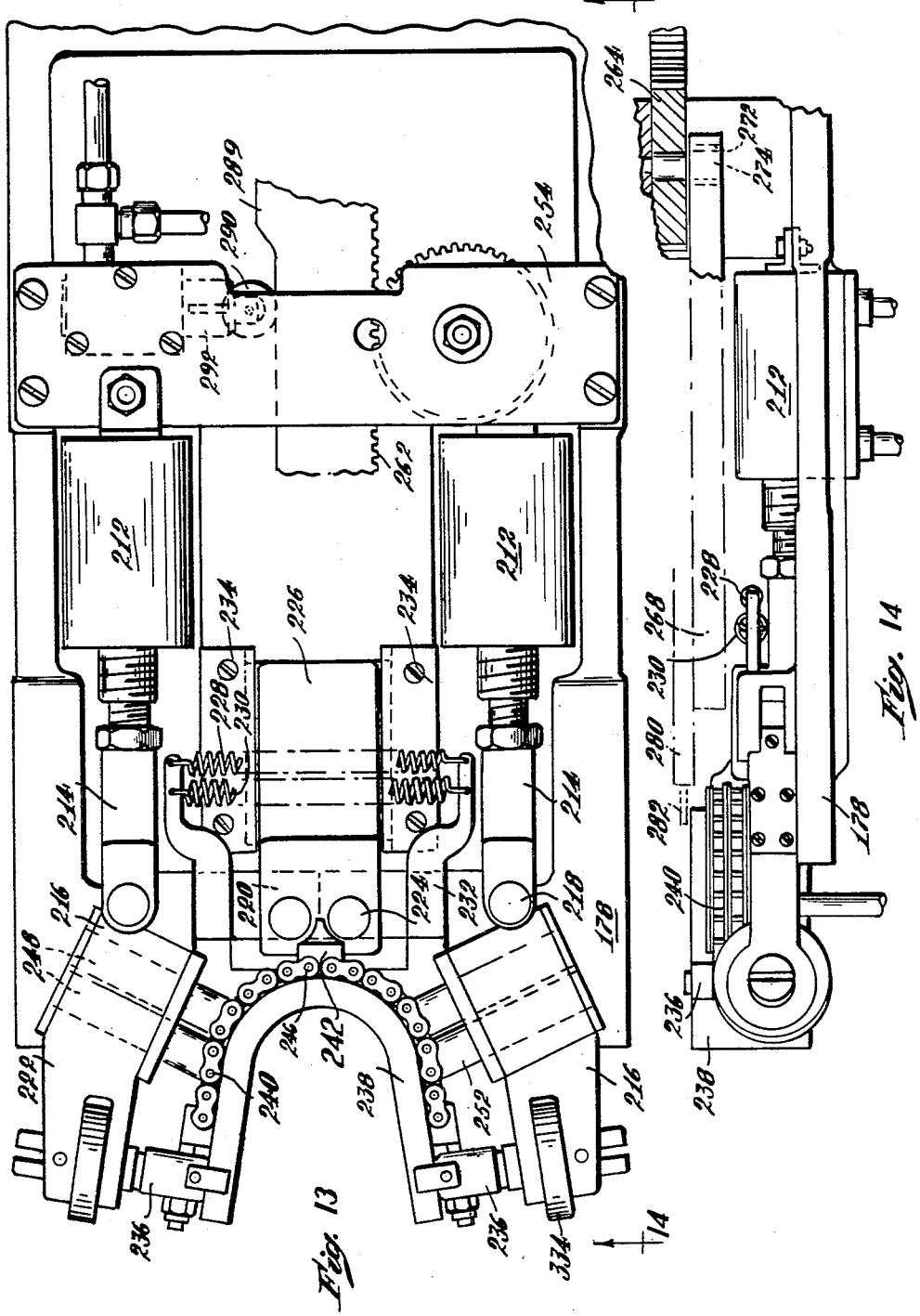

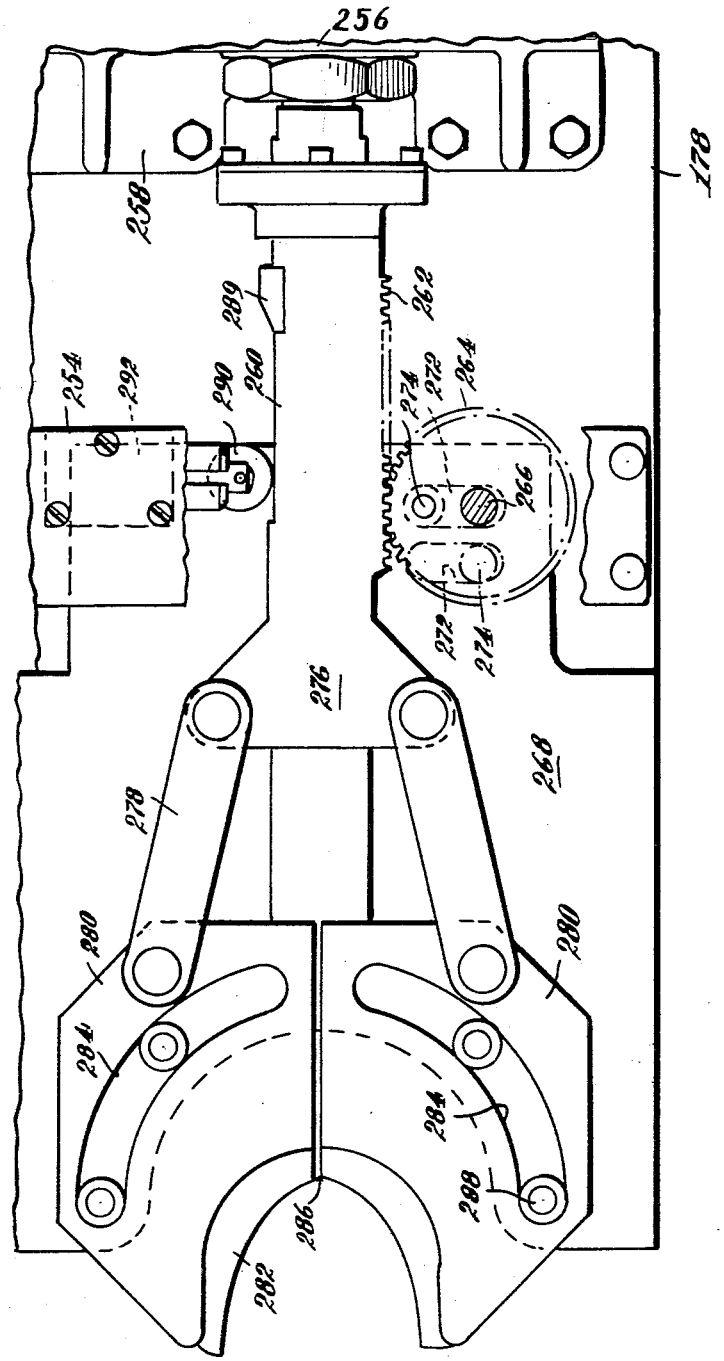

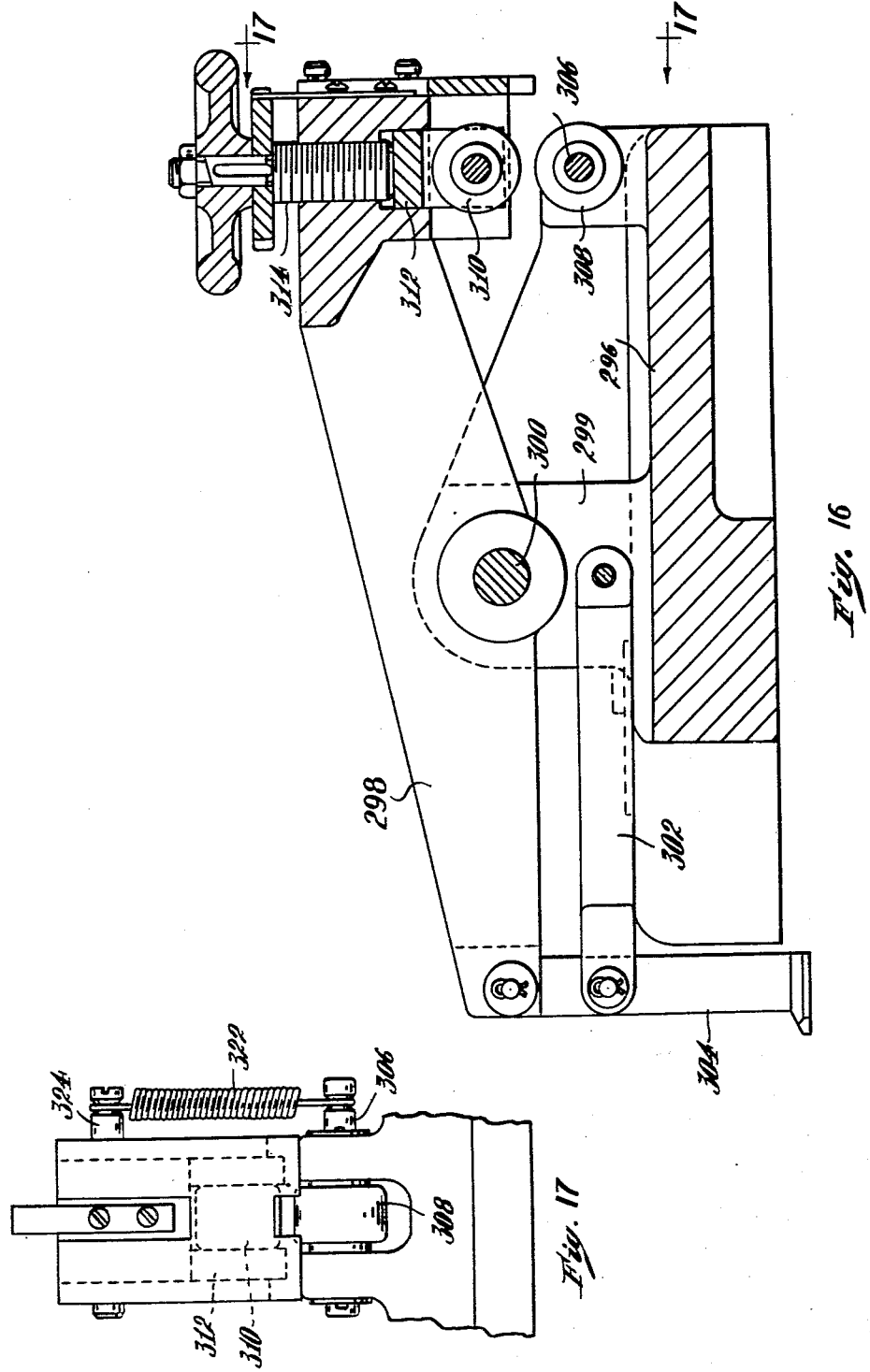

April 28, 1964 J. S. KAMBORIAN 3,130,429
HEEL SEAT LASTING WITH BREAST LINE PINCERS
Filed July 21, 1961 19 Sheets-Sheet 15

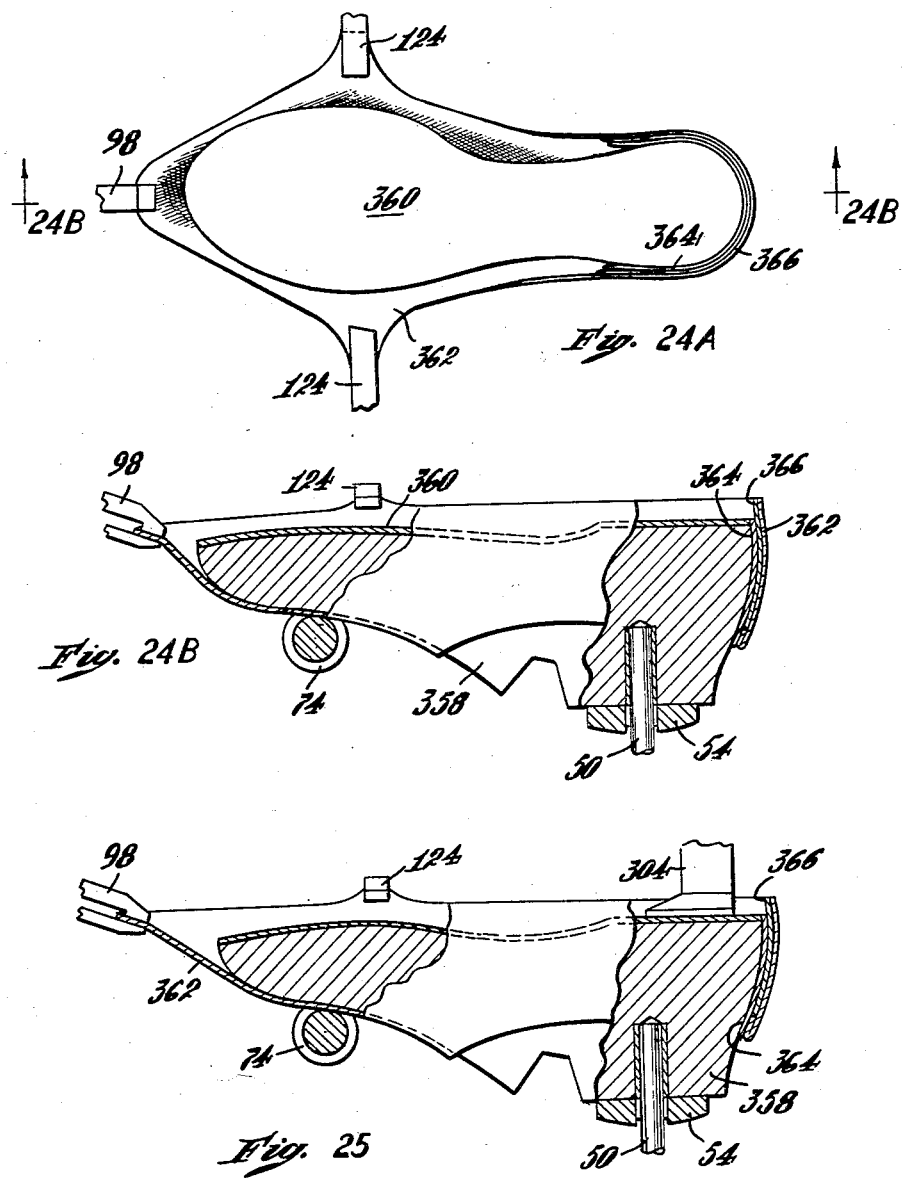

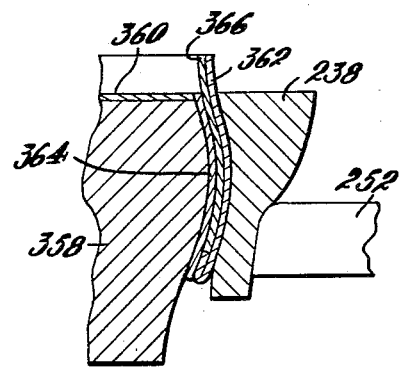
Fig. 28
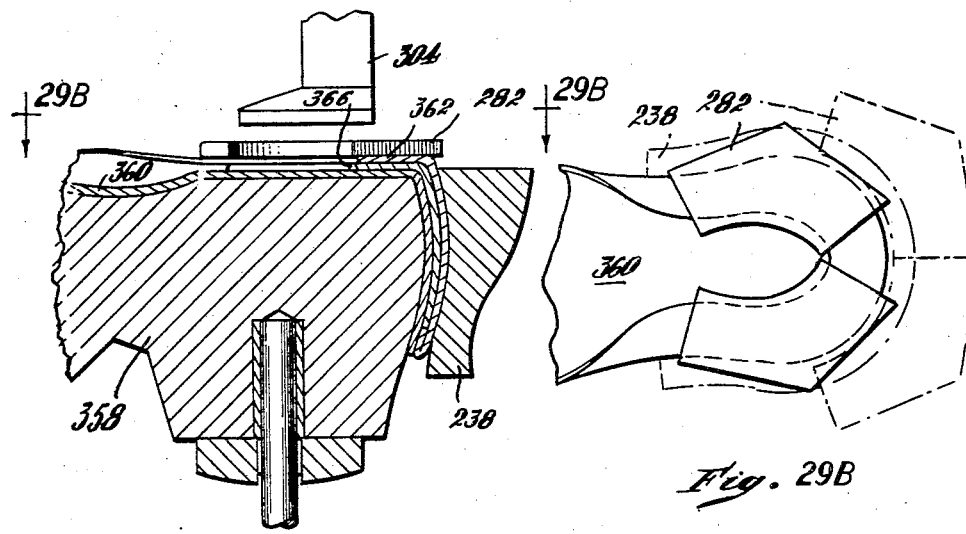
Fig. 29A
Fig. 29B

United States Patent Office 3,130,429
Patented Apr. 28, 1964

3,130,429
HEEL SEAT LASTING WITH BREAST LINE PINCERS
Jacob S. Kamborian, 133 Forest Ave., West Newton, Mass.
Filed July 21, 1961, Ser. No. 125,691
26 Claims. (Cl. 12—145)

In copending application Serial No. 107,156 filed May 2, 1961, there is disclosed an apparatus for lasting shoes which carries out the method disclosed in pending application Serial No. 80,919 filed January 5, 1961.

The method of application Serial No. 80,919 deals with the counter molding and heel seat lasting of a shoe using a thermoplastic counter that is rigid at ambient temperatures, is rendered flaccid when heated above a predetermined temperature, and becomes rigid again when cooled to ambient temperatures. The counter is coated with an adhesive that becomes tacky at the temperature at which the counter becomes flaccid. In carrying out the method, the heated counter is inserted in a counter pocket at the heel of an upper formed by the upper and a liner stitched to the upper. The counter is draped about a last supported bottom up on a last support and having an insole secured to its bottom with the margins of the upper and counter at the heel of the last extending above the insole. The upper is then gripped by pincers at its toe and forepart portions and pulled away from the heel to stretch the upper about the heel of the last and initiate the molding of the counter to the last. The shoe and last are then moved against a hold-down to clamp the shoe and upper between the last support and the hold-down bearing against the insole. The pincers are then moved upwardly to stretch the upper on the last, after which the heel of the upper is clamped against the last to complete the molding of the counter to the shape of the last and hold the heel of the upper stationary on the last. The margins of the upper and counter are then wiped down upon the insole to last the heel seat of the shoe and adhesively bond the upper to the insole through the counter.

The instant invention provides for an improvement in the above described method in gripping the upwardly extending margin at the breastlines by breastline pincers after the toe and forepart pincers have stretched the upper on the last and moving the breastline pincers toward each other to assist in the molding of the upper to the shape of the last and to lay the margin of the upper at the heel before the wipers to ensure that the wipers wipe all of the upper margin at the heel. Concomitantly with the movement of the breastline pincers toward each other, the forepart pincers are opened so that the inward pull exerted by the breastline pincers does not fight against the outward pull exerted by the forepart pincers.

The apparatus of application Serial No. 107,156 comprises wiping means movable forwardly in a predetermined plane, heel clamping means located below the wiping means, a shoe support located forwardly of the wiping and clamping means, a hold-down located above the shoe support and forwardly of the wiping and clamping means, and toe and forepart pincers located above the shoe support and forwardly of the wiping and clamping means. An automatic control system is provided which comprises means to cause the toe and forepart pincers to grip the toe and forepart portions of the upper and exert a forward pull thereon to stretch the upper about the heel of the last, move the shoe support below the hold-down and move it upwardly to cause the insole to bear against the hold-down, actuate the clamping means to clamp the heel of the upper against the last and move the wipers forwardly to wipe the upper margin at the heel down upon the insole.

The apparatus of the instant invention comprises breast line pincers having normally open jaws located above the shoe support intermediate the forepart pincers and the wiping and clamping means. The automatic control has been modified so that after the shoe support has been moved upwardly to cause the insole to bear against the hold-down and to cause the breast line portions of the upper to be inserted between the open jaws of the breast line pincers, the breast line pincers are caused to be closed. The breast line pincers are then caused to move toward each other as the heel clamping means is actuated to clamp the upper. Concomitantly with the inward movement of the breast line pincers, the forepart pincers are actuated to release the forepart portions of the upper.

In the accompanying drawings:
FIG. 1 is a side elevation view of the machine;
FIG. 2 is a front elevation view of the machine;
FIG. 3 is a side elevation view of the shoe support, and of an upper tensioning mechanism which includes the toe and forepart pincers;
FIG. 4 is a front elevation view of the upper tensioning mechanism;
FIG. 5 is a top plan view of the upper tensioning mechanism and shoe support;
FIG. 6 is a deail of motor control causing the toe and forepart pincers to stretch the upper about the heel of the last;
FIG. 7 is a side elevation view of a mechanism for swinging the shoe support from an initial position remote from the wiping and clamping means to a working position adjacent the wiping and clamping means;
FIG. 8 is a view taken on the line 8—8 of FIG. 7;
FIG. 9 is a side elevation view of a mechanism for moving the wiping and clamping means from an initial out-of-the-way position to a working position;
FIG. 10 is a view taken on the line 10—10 of FIG. 9;
FIG. 11 is a side elevation partly in section of the wiper actuating means and the hold-down actuating means;
FIG. 12 is a section showing the relationship of the hold-down and wipers as they are mounted in the frame of the machine;
FIG. 13 is a top plan view of the heel clamp and the heel clamp actuating means;
FIG. 14 is a view taken along the line 14—14 of FIG. 13;
FIG. 15 is a top plan view of the wipers and wiper actuating means;
FIG. 16 is a side elevation view of the hold-down;
FIG. 17 is a view taken along the line 17—17 of FIG. 16;
FIG. 18 is a detail of a presser member;
FIG. 19 is a schematic representation of a valve and a pair of fluid motors used in operating the toe and forepart pincers;
FIG. 20 is a plan view of a breast line pincers;
FIG. 21 is a side elevation taken along the line 21—21 of FIG. 20;
FIG. 22 is a schematic representation of the air control system of the machine;
FIG. 23 is a view of the counter inserted in the counter pocket;
FIG. 24A is a plan view of the shoe and last after they have been placed in the machine and the upper has been gripped by the toe and forepart pincers;
FIG. 24B is a view taken along the line 24B—24B of FIG. 24A;
FIG. 25 is a showing of the shoe and last after the shoe has been brought to bear against the hold-down;
FIG. 26A is a plan view of the shoe and last after the breast line portions of the upper have been gripped by the breast line pincers;
FIG. 26B is a view taken along the line 26B—26B of FIG. 26A;

FIG. 28 is a vertical section showing the shoe after it has been clamped by the heel clamping pad;

FIG. 29A is a vertical section showing the heel of the shoe at the completion of the lasting operation; and FIG. 29B is a view taken along the line 29B—29B of FIG. 29A.

Figure 1:
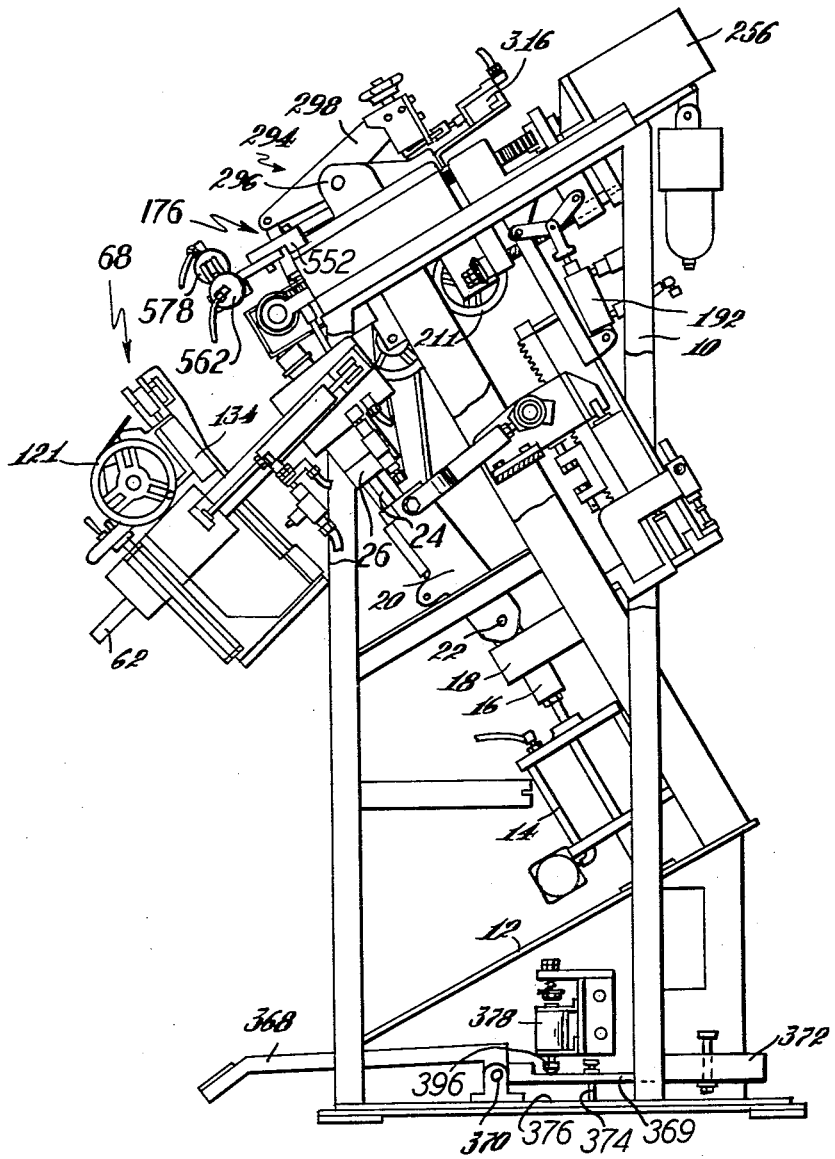
Figure 2:
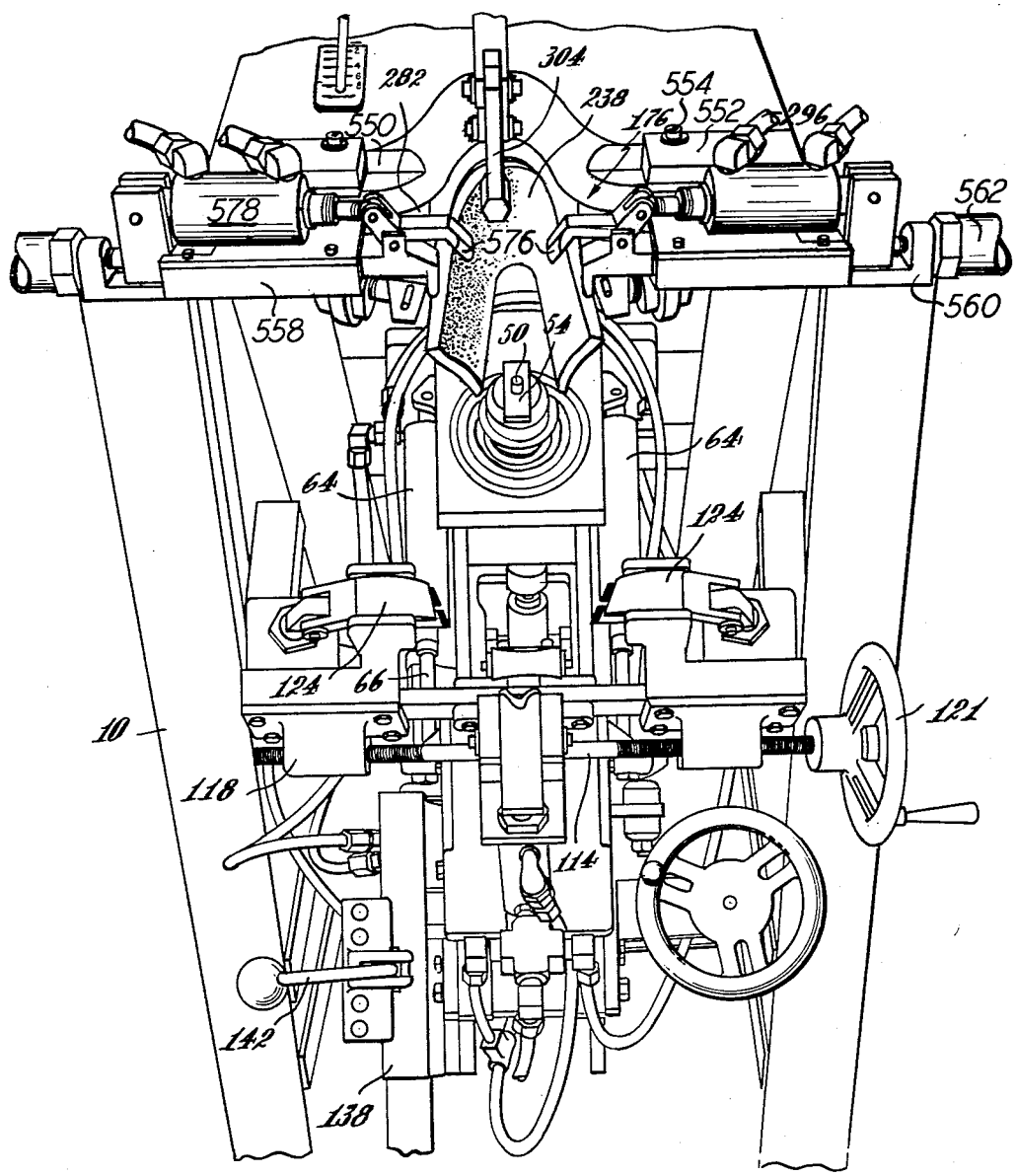
Figure 3:
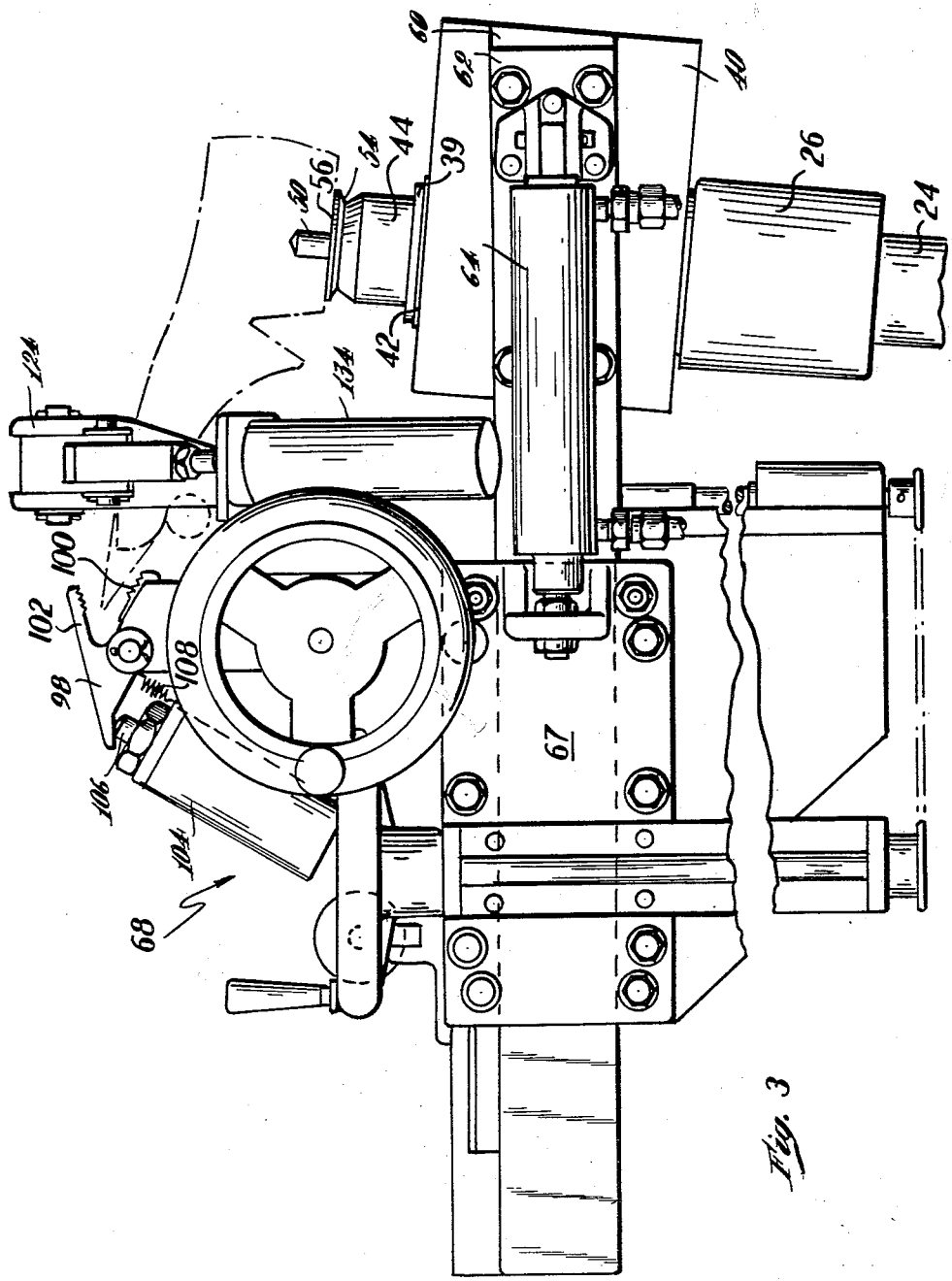
Figure 4:
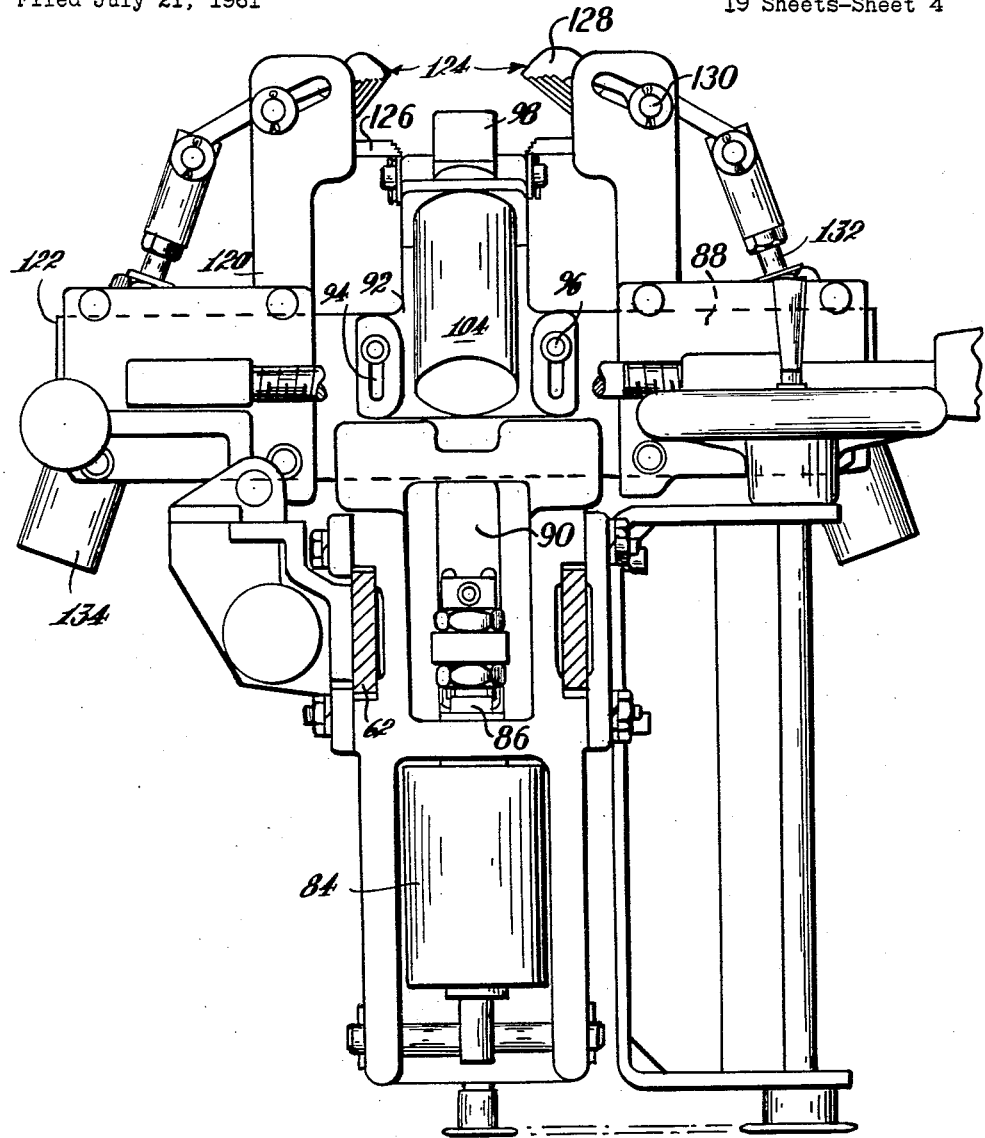

Referring to FIGS. 1 and 2, the machine comprises a frame 10 having an inclined plate 12. An air actuated motor 14, mounted on the plate 12, has a piston rod 16 extending upwardly therefrom that is vertically guided in a guide bearing 18 secured to the frame. A post 20 is pivotally secured to the piston rod 16 by a pivot 22. A rod 24 is received in a socket in the upper end of the post 20. The rod 24 has a collar 26 adjustably mounted thereon. A sleeve 39 (FIG. 3) is slidably mounted on the rod 24 and rests on the collar 26. A swivel block 40 is pivotally mounted on the sleeve for swinging movement about the axis of the rod 24 and the sleeve 39 with the bottom of the block 40 resting on the collar 26, and a snap ring 42 in the sleeve 39 engaging the top of the block 40.

A last pin holder 44 is mounted in the upper end of the rod 24. A last pin 50 is fastened in an axial hole in the last pin holder and projects upwardly therefrom. The last pin holder 44 receives a last supporting plate 54 on its upper surface, the plate 54 having a flat upper surface 56 and a hole through which the last pin 50 projects.

The swivel block 40 has a groove 60 on each side thereof, and parallel bars 62 are rigidly mounted in each groove 60 to extend forwardly of the block 40. An air operated motor 64 is pivotally connected to each bar 62 to extend forwardly of the block 40. The piston rods 66 of the motors 64 are rigidly connected to a head 67 forming part of an upper tensioning unit 68 that is slidably mounted on the bars 62.

Referring to FIGS. 3 through 6, the unit 68 has a toe rest roller 74 mounted therein at its forward end. An air operated motor 84 has a piston rod 86 that is connected to a T-bar 88 that is slidably mounted for up-and-down movement in the unit 68. A toe pincers bracket 92 is connected to the top of the upright limb 90 of the T-bar by studs 96 that are threaded into the T-bar and are received in slots 94 in the bracket 92. A toe pincers 98 is mounted on the bracket 92. The pincers 98 comprises a stationary pincers jaw 100 rigidly connected to the bracket 92 and a movable pincers jaw 102 swingably mounted on the bracket 92. An air operated motor 104, mounted on the bracket 92, has a piston rod 106 engageable with the pincers jaw 102, the latter member being normally urged to open position by a spring 108. A shaft 114 extending below the bracket 92 has right and left hand threads at its opposite ends whereby it is screwed into bosses 118 that are secured to forepart pincers brackets 120. A wheel 121 is secured to one of the ends of the shaft 114. The brackets 120, which are slidably mounted on the prone legs 122 of the T-bar 88, support forepart pincers 124. Each forepart pincers 124 comprises a fixed jaw 126 rigidly connected to a bracket 120 and a movable jaw 128 pivotally mounted on a bracket 120 by a pivot 130 and pivotally connected to the piston rod 132 of an air operated spring return motor 134 that is secured to an extension 136 on each bracket 120.

Figure 5:
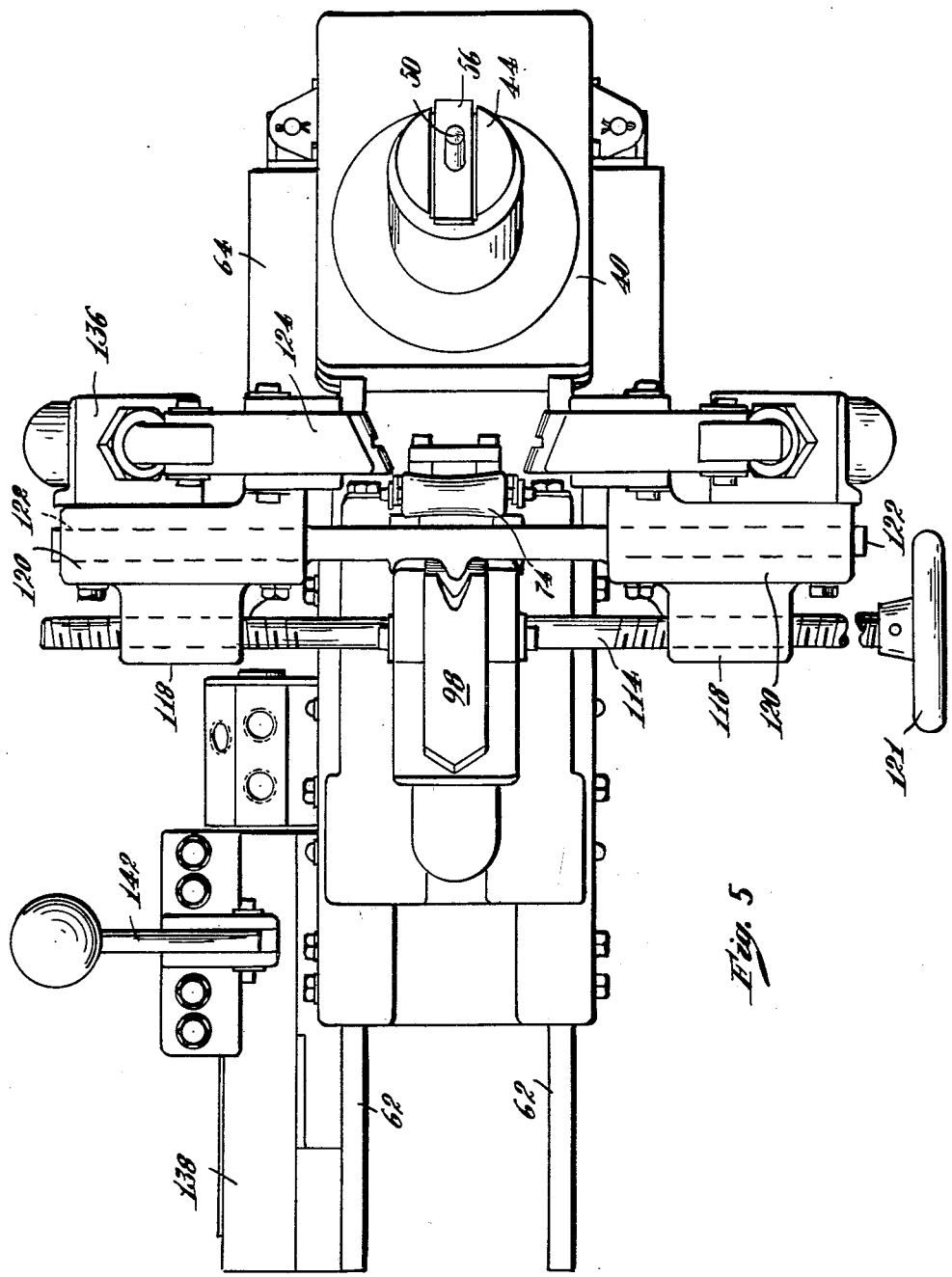
Figure 6:
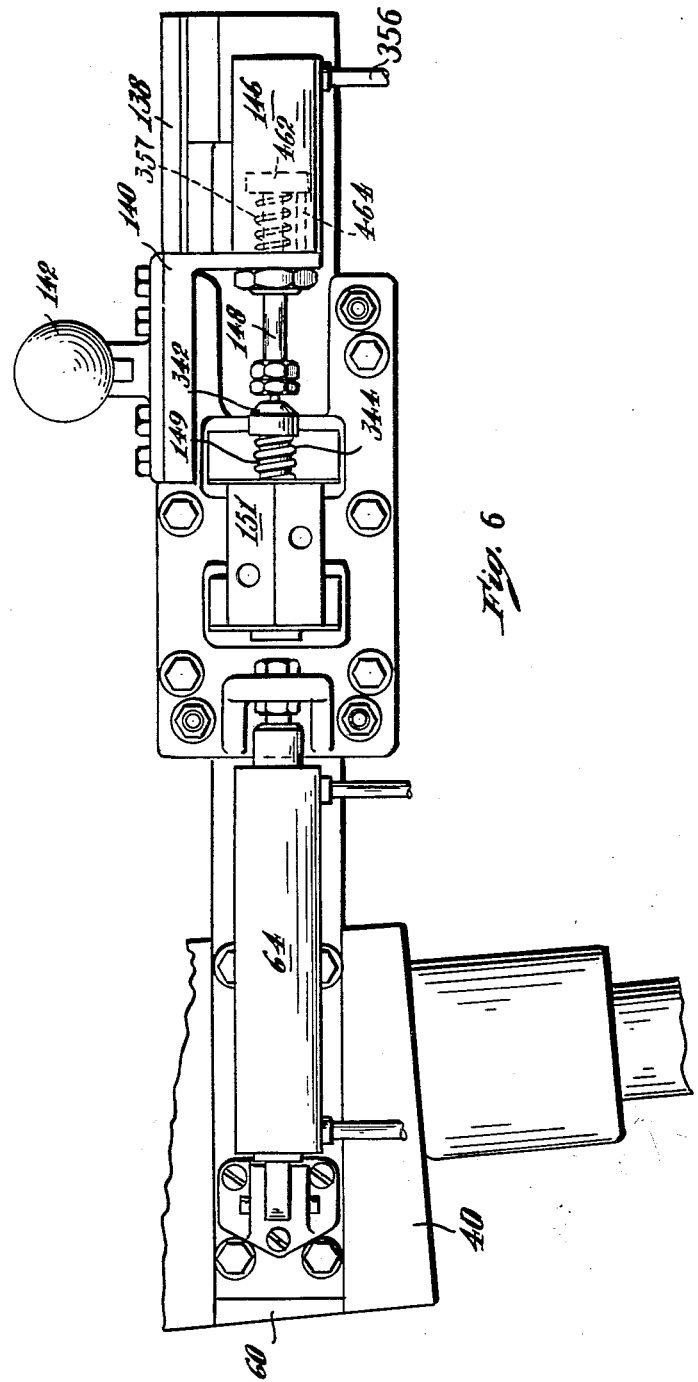

A shelf 138 is secured to one of the bars 62 (see FIGS. 5 and 6). A bracket 140 is slidably mounted on the shelf 138 and can be locked in a desired position on the shelf by swinging a handle 142. The bracket 140 has a spring return air operated pilot motor 146 mounted thereon. The piston rod 148 of the motor 146 is engageable with the valve spool 149 of a pilot valve 151 mounted on the upper tensioning unit 68.

The pilot valve 151, as shown in FIG. 19, has a centrally located air inlet port 336 and vent ports 338 and 340 on opposite sides of the port 336. The valve spool 149 has a knob 342 at one end and a compression spring 344 is interposed between the knob 342 and the valve housing 346 to yieldably urge the valve spool against the piston rod 148 (FIG. 6). The valve has a port 348 that is connected to one end of the motors 64 and a port 350 that is connected to the other end of the motors 64. Lands 352 and 354 on the valve spool 149 normally block the ports 348 and 350. Air normally enters the inlet port 356 of the motor 146 to extend the piston rod 148 out of the motor against the pressure of the spring 357 in the motor. Movement of the piston rod 148 rightwardly causes the spring 344 to push the valve spool 149 rightwardly (FIGS. 6 and 19) and follow the piston rod and thus provide an air path between the valve ports 336 and 350 to thereby actuate the motors 64 to move the upper tensioning unit 68 along the bars 62 away from the block 40 until the piston rod 148 again moves the valve spool 149 to the FIG. 19 position. Movement of the piston rod 148 leftwardly against the pressure of the spring 357 moves the knob 342 leftwardly in the valve housing to provide an air path between the ports 336 and 348 to actuate the motors 64 to move the upper tensioning unit along the bars 62 towards the block 40 until the piston rod 148 stops its leftward movement and the valve spool 149 reassumes its FIG. 19 position.

Figure 7:
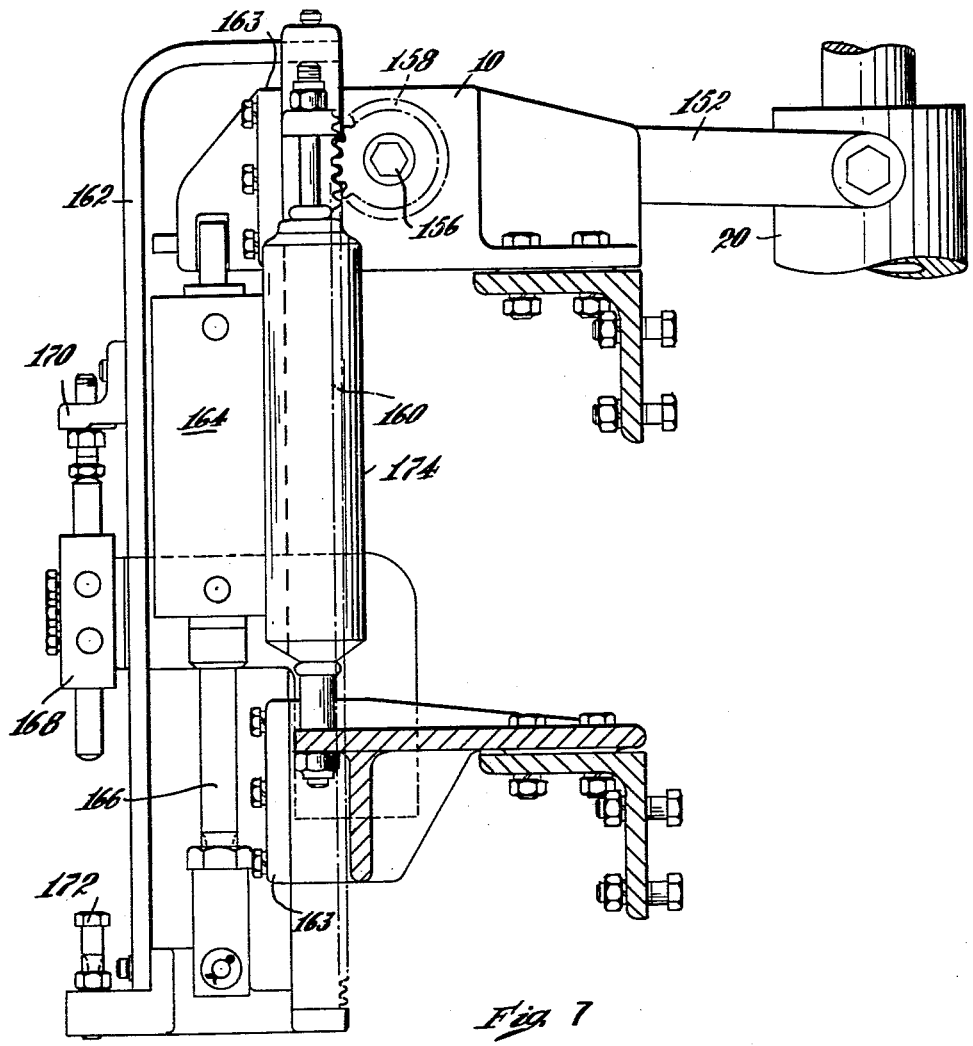
Figure 8:
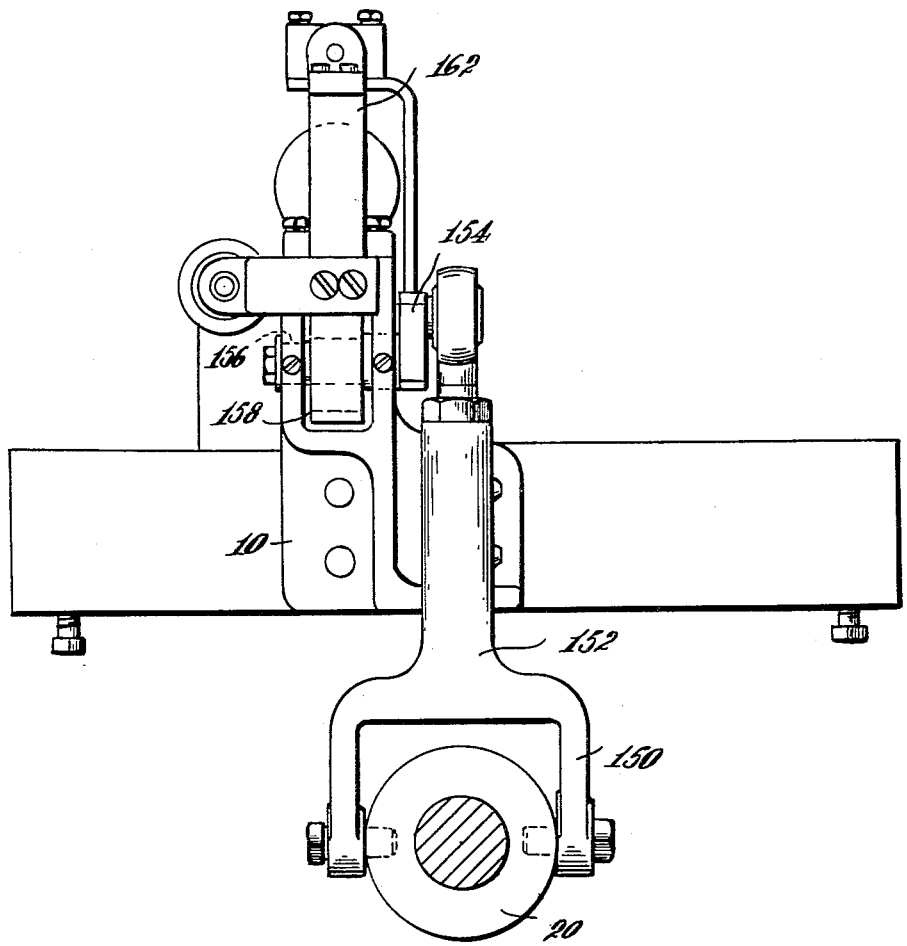
Figure 10:
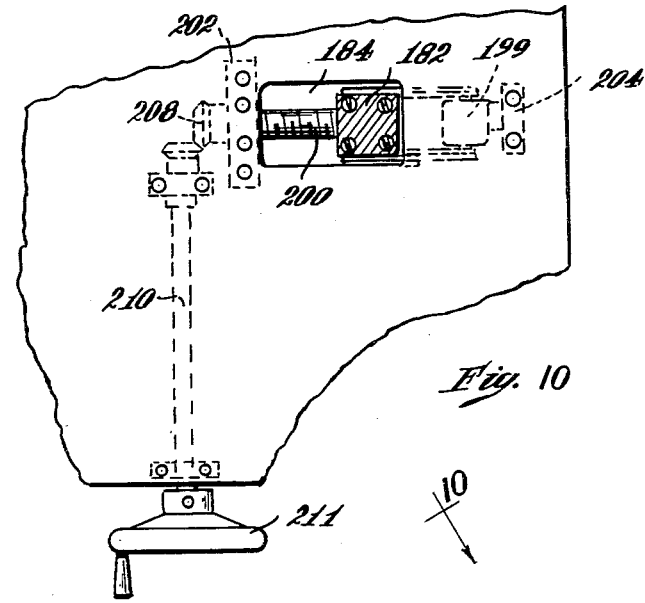
Figure 9:
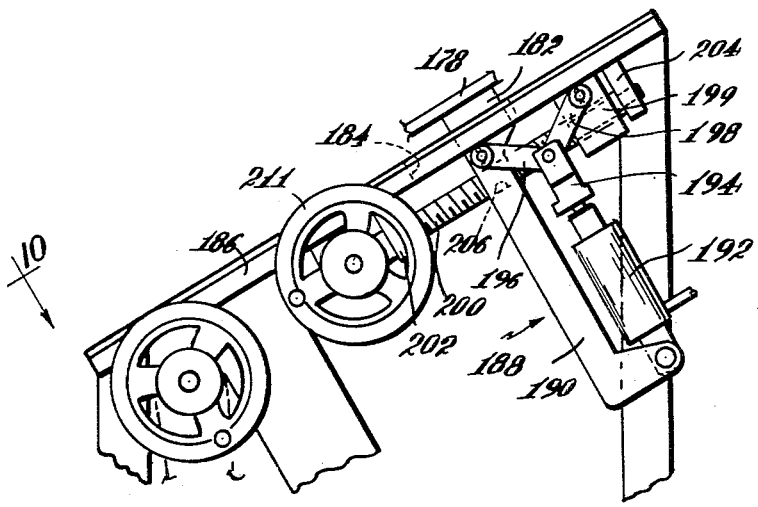
Figure 20:
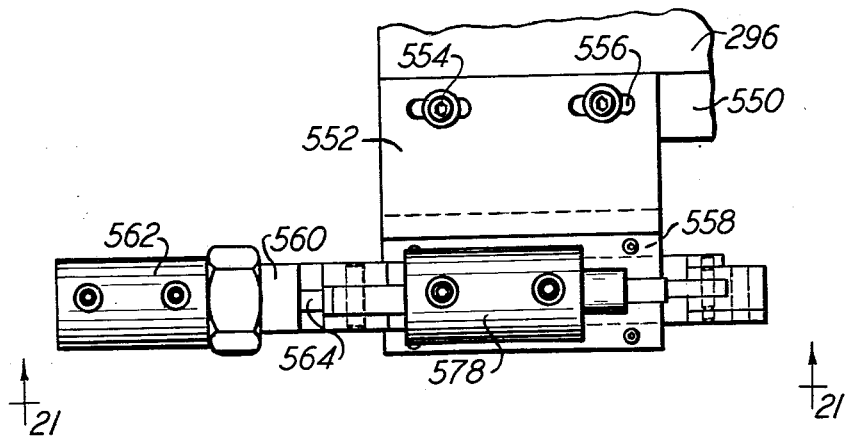
Figure 21:
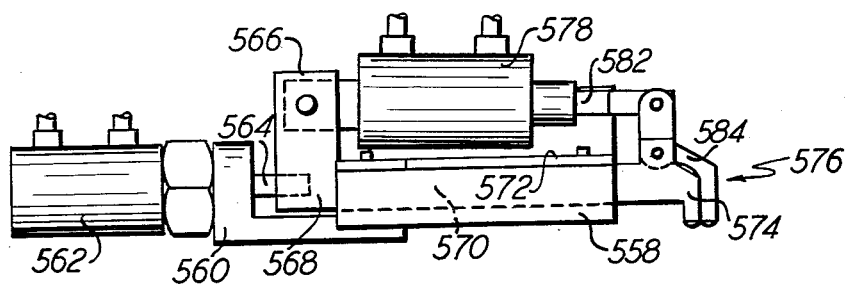

The post 20 is pivotally connected to the legs 150 of a forked pitman 152 that straddles the post (see FIGS. 7 and 8). The pitman 152 is pivotally and eccentrically connected to a crank 154. The crank 154 is connected to a shaft 156 which in turn is pivotally mounted in the frame 10. The shaft 156 has a gear 158 secured thereto that is in mesh with a rack 160 mounted on a D-shaped rack support 162, the rack being slidable in gibs 163 located in the frame 10. An air operated motor 164, mounted in the frame 10, has a piston rod 166 connected to the rack frame 162 to effect the vertical movement of the rack 160 and hence swinging movement of the post 20 about the pivot 22. A valve 168 is mounted in the frame 10 and has a valve spool engageable by lugs 170 and 172 at either extremity of movement of the rack frame 162, the lugs being adjustably mounted in the rack frame. A shock absorber 174 is interposed between the frame 10 and the rack 160 to eliminate chattering and ensure a smooth operation when the rack is caused to move upwardly or downwardly in the frame.

A heel seat lasting unit 176 is mounted in the frame 10 rearwardly of the upper tensioning unit 68. Referring to FIGS. 9 through 17, the unit 176 comprises a main slide plate 178 slidably mounted for forward and rearward movement on gibs 180 in the frame 10 (see FIG. 12). A block 182 is secured to the plate 178 and is movable in a slot 184 formed in a table 186, which table forms a part of the frame 10. A floating actuator 188 is secured to the block 182. The actuator 188 comprises a bar 190 depending from and rigid with the block 182. An air operated motor 192 is pivoted to the bar 190 and has a piston rod 194 extending upwardly therefrom. A pair of toggle links 196 and 198 are pivoted at their adjoining ends to the piston rod 194, and are respectively pivoted at their other ends to the bar 190 and to a nut 199. A screw 200 is rotatably mounted in hangers 202 and 204 depending from the table 186, extends through a clearance opening 206 in the bar 190 and is threaded into the nut 199. The screw 200 is connected through a gear train 208 and a shaft 210 to a wheel 211. Thus, rotation of the wheel 211 causes the nut 199 to move axially of the screw 200 and causes the floating actuator 188, the block 182, the main slide plate 178 and the members carried thereby to move forwardly and rearwardly in the frame. Actuation of the motor 192 to open or close the toggle linkage formed by the members 194, 196 and 198 will also cause the main slide plate 178 and the members carried thereby to move forwardly and rearwardly in the frame, forward movement of the plate 178 causing the heel seat unit 176 to be moved from an out-of-the-way position to a working position as described below.

A pair of air actuated motors 212 are mounted on the plate 178 (FIGS. 13 and 14). Each motor 212 has a piston rod 214 that is pivotally connected to a lever 216 by a pivot 218. The levers 216 have legs 220 extending toward each other and legs 222 extending forwardly and divergently from the pivots 218. The legs 220 are pivotally connected by pivots 224 to a slide 226. A pair of tension springs 228 and 230 are connected at their opposite ends to arms 232 that are fixed to the legs 220. The springs force the levels 216 about the pivots 218 to the position shown in FIG. 14 where the contiguous faces of the legs 220 abut each other. The slide 226 is slidably mounted in gibs 234 mounted on the plate 178. The lever legs 222 have studs 236 adjustably mounted in their extremities, and the studs 236 are affixed to the ends of a U-shaped heel clamping pad 238 made of a flexible material such as leather. Sprocket chains 240 are wrapped around the outer periphery of the pad 238. Each chain 240 is anchored at one end to a stud 236 and at the other end to a projection 242 located on the slide 226. A pair of spring return air operated motors 248 are mounted in each of the lever legs 222 (FIGS. 13 and 18). The motors 248 have pistons 250 extending toward the pad 238 below the chains 240. A presser member 252 is affixed to each piston 250.

A bridge 254 is anchored at its ends to the sides of the main slide plate 178 and extends thereover (FIGS. 13 and 15). An air operated motor 256 is secured to a rib 258 at the rear of the main slide plate 178. The piston rod 260 of the motor 256 has a rack 262 thereon that is in mesh with a gear 264 rotatably mounted beneath the bridge 254 on a pin 266 fixed in the bridge. A wiper supporting slide plate 268 is slidably supported on gibs 270 in the frame (FIGS. 12 and 15). The plate 268 has a slot 272 extending transversely to the rack 262 which receives an eccentrically mounted crank pin 274 depending from the gear 264. The piston 260 has an enlargement 276 at its forward end to which are pivoted the ends of links 278. The opposite ends of the links 278 are pivoted to wiper cams 280, and a wiper 282 is mounted in each wiper cam. The wiper cams 280 have curved cam slots 284 with a center of curvature at the point where the wipers diverge from each other, indicated by the numeral 286 in FIG. 15. The wiper cams rest on the plate 268, and the plate 268 has rollers 288 extending upwardly therefrom into the cam slots 284. A valve actuating lug 289 mounted on the piston rod 260 is engageable with the valve spool 290 of a valve 292 that depends from the bridge 254.

A hold-down unit 294 is mounted on a frame cover 296 located above the plates 178 and 268 and the wiper cams 280. The unit 294 comprises a lever 298 pivoted to a clevis 299 on the cover 296 by a pivot 300, see FIGS. 11, 16 and 17. A link 302 is pivoted to the cover 296 below the pivot 300, and both the lever 298 and the link 302 are pivotally connected to a hold-down foot 304. The lever 298, link 302 and foot 304 thus form a parallel linkage mechanism whereby counterclockwise movement of the lever (FIG. 16) imparts a substantially rectilinear downward movement to the foot 304 and clockwise movement of the lever 298 imparts a substantially rectilinear upward movement to the foot 304.

A pin 306 is rotatably mounted in the cover 296 rearwardly of the pivot 300, and a roller 308 is affixed to the pin 306. A roller 310 is rotatably mounted in a clevis 312 that is slidably mounted for up and down movement at the rear end of the lever 298 opposite the roller 308. A screw 314 bears against the upper surface of the clevis 312 to limit the upward movement of the clevis 312 in the lever 298.

An air operated spring return motor 316 is secured to the cover 296. The piston rod 318 of the motor 316 has a cam 320 secured thereto that is interposed between the rollers 308, 310. A tension spring 322 extending from the pin 306 to a pin 324 fixed to the lever 298 urges the roller 310 against the cam 320. The cam 320 has a high portion 326 that is normally interposed between the rollers 308, 310. The actuation of the motor 316 to bring a low portion 328 of the cam between the rollers will cause the spring 322 to move the roller 310, which acts as a cam follower, downwardly against the cam portion 328, swing the lever 298 clockwise (FIG. 11), and thereby raise the hold-down foot 304, for a purpose that is explained below.

Referring to FIGS. 1, 2, 20 and 21, right angled recesses 550 are provided at the forward ends of the cover 296 on opposite sides of the hold-down foot 304. A mounting plate 552 is adjustably connected to each recess 550 by screws 554 extending through elongated apertures 556 in the plates and threaded into the cover 296. By loosening the screws 554 and moving the plates 552 an amount permitted by the apertures 556, the distance from each other of the mounting plates and the members carried thereby may be adjusted. A gib plate 558 is connected to and extends forwardly of each mounting plate 552, and a bracket 560 is connected to and extends outwardly of each gib plate 558. An air operated motor 562 is connected to and extends outwardly of each bracket 560. The piston rod 564 of each motor 562 is connected to an L-shaped slide bar 568 having an upright leg 566 and a prone leg 570. The prone leg 570 of each slide bar 568 is slidably mounted in a gib plate 558 beneath a cover plate 572. The inner end of each slide bar 568 is formed into the stationary jaw 574 of a breast line pincers 576. An air actuated motor 578 is pivotally connected to and extends inwardly of the upright leg 566 of each slide bar 568. The piston rod 582 of each motor 578 is pivotally connected to the movable jaw 584 of a pincers 576, each jaw 584 being pivotally connected intermediate its ends to a slide bar 568.

Although the apparatus can be used to assemble an upper on a last and heel seat last the upper onto the insole, it has particular utility in carrying out a method similar to that disclosed in the above cited copending application Serial No. 80,919 filed January 5, 1961. In the referred to method, a flaccid counter coated on both of its surfaces with adhesive is inserted in a pocket formed between an upper and a liner at the heel end of the upper, the upper is draped about the last, tensioning forces are applied at the toe end of the upper to wrap the upper about the heel end of the last and initiate the molding of the counter to the shape of the last, the last is moved to a heel seat lasting position and forced upwardly against a hold-down, upward tensioning forces are applied at the toe end of the upper to assemble the upper on the last, a clamping force is applied at the heel of the last to maintain the upper stationary on the last and to complete the molding of the counter to the shape of the last, and the margins of the upper and counter are wiped down onto an insole located on the bottom of the last to thereby unite the lasted margin of the upper to the insole by adhesively bonding the counter to the upper and insole.

In setting up the machine for a particular size of last, the adjustments described in the above cited copending application Serial No. 107,156 filed May 2, 1961, are made to adjust the contour of the clamping pad 238, the spacing between the forepart pincers 124, the heightwise position of the upper tensioning unit 68 with respect to the last pin 50 at the upper end of the rod 24, the position of the hold-down foot 304 which should be positioned below the wipers 282 an amount that is dependent on the thickness of the upper margin and the counter, the out-of-the-way position of the heel seat lasting unit 176, the position of the upper tensioning unit on the bars 62 and the heightwise position of the toe rest roller 74. In addition, the spacing between the breast line pincers 576 is adjusted by moving the slots 556 of the mounting plates 552 along the screws 554 and then tightening the screws. The jaws of the pincers 576 are normally open and the pincers are normally in their outward position as indicated in FIG. 2.

An automatically operated pneumatic control system is provided to cause the machine to go through a cycle. The system is actuated by a foot controlled pedal 368 (FIG. 1) that is pivoted to the frame 10 by a pivot 370 and is urged clockwise about the frame by a counterweight 372. A stop screw 374, threaded into a pedal extension 369 that extends rightwardly of the pivot 370, is engagable with a bar 376 of the frame 10 to limit the amount the pedal may move clockwise under the influence of the counterweight. A pilot valve 378 is mounted above the lever extension 369 and has a valve spool 396 that is resiliently urged into engagement with the lever extension 369.

Figure 22:
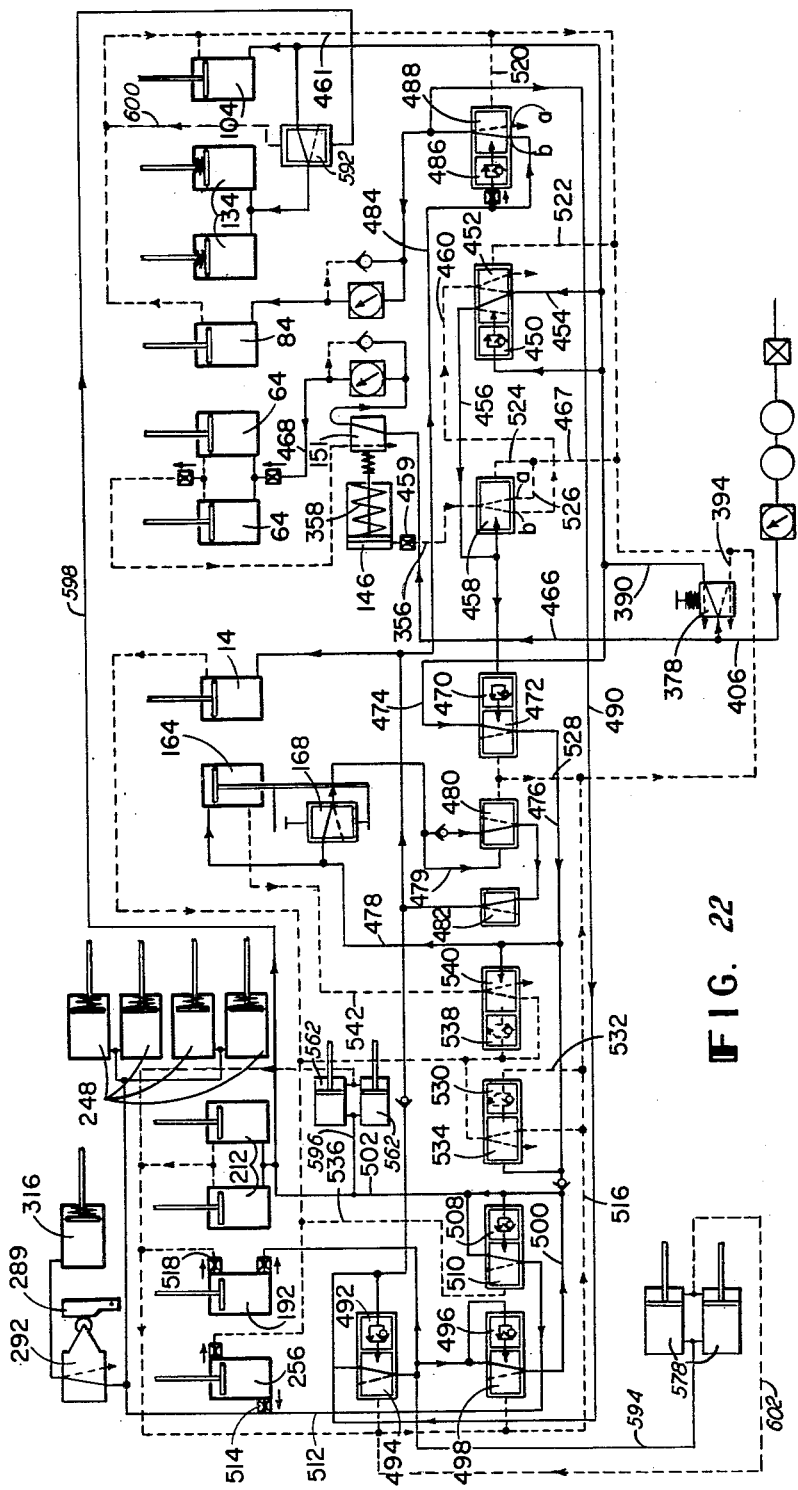

A control is provided whereby with the left side (FIG. 1) of the treadle in an up position an air passage is open between an air inlet line 406 (FIG. 22), that is connected to a source of air pressure (not shown), the valve 378, and a line 394 leading to the venting side of the system indicated by dotted lines in FIG. 22. At the same time air from the working side of the system, indicated in solid lines in FIG. 22, escapes to atmosphere through a line 390 and the valve 378. A depression of the treadle 368 to a down position moves the valve spool 396 upwardly to cause air under pressure to enter the working side of the system from the line 406 through the valve 378 and to permit air on the venting side of the system to pass to atmosphere through the line 394 and the valve 378. A positioning of the pedal in a median position intermediate the up and down positions causes the machine parts to maintain the position they had assumed at that time and the system to be balanced in neutral position.

The control system includes a plurality of sequence valves so constructed that air passing into them in one direction must overcome a spring force and will take a path of lesser resistance, if one is available, prior to passing through the sequence valve. Air passing into the sequence valves in the other direction meets no appreciable resistance and pass therethrough immediately.

Reference is made to the aforementioned application Serial No. 107,156 filed May 2, 1961 for a more detailed description of the construction of the pilot valve 378 and of the sequence valves.

Figure 23:
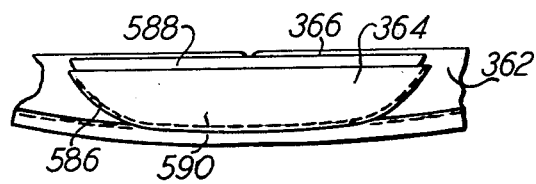

A shoe upper 362 is provided having a liner 364 united thereto by a seam 586 at the heel end of the upper, see FIG. 23. A shoe stiffener or counter 366 is inserted in the pocket formed between the upper 362 and the liner 364 with an exposed portion 588 of the counter extending upwardly of the upper edge of the liner and a concealed portion 590 of the counter lying between the liner and upper. The counter material is made of a homogeneous thermoplastic material and has the characteristic of being stiff and rigid at ambient temperatures, of becoming soft and flaccid when heated above a predetermined temperature and of returning to its stiff and rigid state when cooled back to ambient temperatures. The counter is coated on both of its surfaces with an adhesive which becomes sticky or tacky when heated above said predetermined temperature.

The counter, upper and liner assembly is heated to a temperature sufficient to render the counter soft and flaccid. This may be done by an apparatus similar to that disclosed in copending application Serial No. 90,874 filed February 21, 1961. This assembly is then draped around a last 358 having an insole 360 mounted on its bottom. The last is placed bottom-up on the last supporting plate 54 with the pin 50 entering the conventional last pin hole in the last. The toe portion of the upper and last is supported on the toe roller 74, the toe end of the upper margin is inserted between the jaws of the toe pincers 98 and the forepart portions of the upper margin is inserted between the jaws of the forepart pincers 124. At this time the upper end of the liner 364 is substantially level with the insole 360 and the upper surfaces of the counter 366 and upper 362 at the heel end of the last extend above the insole as indicated in FIG. 24B.

The operator now depresses the pedal 368 to move the valve spool 396 to a position where the air line 406 is in communication with the air line 390 and the working side of the pneumatic system. Referring to FIG. 22, where the air lines in the working side of the system are drawn solid and the air lines in the venting side of the system are drawn dotted, air pressure passes from the line 390 to the motor 104 and through a three-way valve 592 to the motors 134 to actuate these motors to cause the toe pincers 98 and the forepart pincers 124 to grip the margin of the upper as indicated in FIGS. 24A and 24B. After the motors 104 and 134 have been actuated, the air passes through a sequence valve 450 to actuate a four-way pilot valve 452. The actuation of the pilot valve 452 allows air to pass from a line 454, through the valve 452 and a line 456 into a three way valve 458 to move the valve 458 from its $a$ to its $b$ position. Prior to the depression of the pedal 368 by the operator, air had flowed from the line 406, the valve 378, the line 394, a line 467, a line 526, the valve 458, the line 356 and a flow control valve 459 into the motor 146 to force the piston 462 of the motor leftwardly (FIG. 6) against a stop 464 thereby compressing the spring 357. Immediately after the depression of the pedal 368, the motor 104 was actuated causing air to vent out of the motor 104 through a line 461 and the valve 378. The air passing through the line 461 maintains the pressure against the piston 462 by passing through the valve 458 before the spring 357 can move the piston rightwardly (FIG. 6). The flow control valve 459 slows down the egress of air from the motor 146 sufficiently to allow this to take place. The movement of the valve 458 to its $b$ position allows the air in the motor 146 to vent to atmosphere through the line 356, the valve 458, the line 460 and the valve 452. The spring 357 therefore moves the piston rod 148 rightwardly (FIG. 6) to actuate the valve 151 to cause air to enter the motors 64 through an air line 466, the valve 151 and an air line 468 in the manner described above. Actuation of the motors 64 causes the upper tensioning mechanism including the pincers 98 and 124 to move forwardly on the bars 62 to thereby horizontally stretch the upper in the direction of the toe of the last and cause a firm wrapping of the upper about the heel of the last and a tension force on the counter to start to mold it to the shape of the last.

Air pressure can now pass through a sequence valve 470 to actuate a three-way valve 472 to allow air to pass through the lines 390 and 474, the valve 472 and lines 476 and 478 to the motor 164. The motor 164 is thus actuated to lower the piston rod 166 (FIG. 7) and the rack fram 162 to thereby swing the post 20 about the pivot 22 to a position where the shoe is adjacent to but not in engagement with the heel seat lasting unit 176 and the hold-down unit 294. In this position the post 20 is in alignment with the hold-down foot 304 but the insole 360 is below the bottom of the hold-down foot. In addition, in this position, the shoe upper and last are not in engagement with the heel clamping pad 238.

The lowering of the rack frame 162 causes the lug 170 to engage the three-way valve 168 and actuate the valve to permit air to pass through the valve 168 and air line 479 to actuate a three-way pilot valve 480. The actuation of the valve 480 causes air to pass through the valve 480 and through a quick exhaust valve 482 to the motor 14 to raise the post 20 upwardly and thus raise the last and shoe upwardly until the insole 360 bears against the hold-down foot 304. In this position the shoe and last are clamped between the hold-down foot 304 and the last supporting plate 54, as indicated in FIG. 25, with the upwardly facing surface of the insole slightly below the top surface of the clamping pad 238 and the bottom surface of the wipers 282.

Concomitantly with the actuation of the motor 14 to raise the post 20, air pressure passes through a line 484 to a sequence valve 486. After the motor 14 is actuated, the sequence valve 486 is actuated to shift a pilot valve 488 from its *a* to its *b* position to allow air to pass through the valve 488 to the motor 84. Actuation of the motor 84 raises the T-bar 88 to raise the pincers 98 and 124 to thereby apply an upward tension to the margin of the upper 362 at its toe and forepart portion to thereby stretch the upper tightly on the last and assemble it in proper position for the subsequent heel seat lasting operation. Since the last and shoe are clamped at this time between the foot 304 and the plate 54, upward movement of the pincers will not shift the last.

After the motor 84 has been actuated, air can pass from the valve 488 through the line 490 and through the sequence valve 492 to actuate the pilot valve 494. Actuation of the pilot valve 494 causes air to pass from the line 490 through the valve 494 to the motor 192 on the floating actuator 188 to thereby raise the piston rod 194 and straighten the toggle links 196 and 198. The straightening of the toggle links moves the block 182 and the heel seat lasting unit 176 carried thereby from its normal out-of-the-way position to a position adjacent the shoe and last.

Figure 26A:
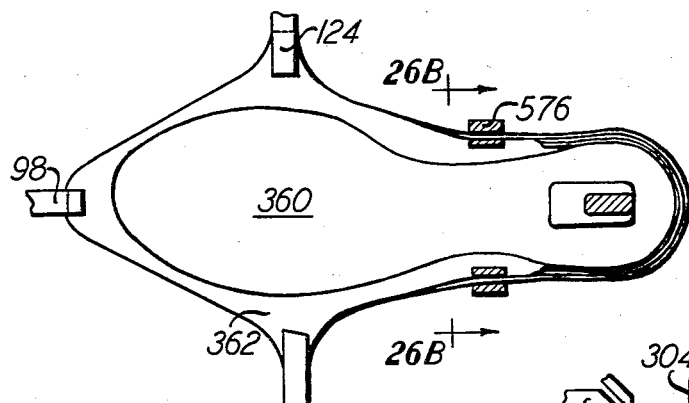
Figure 26B:
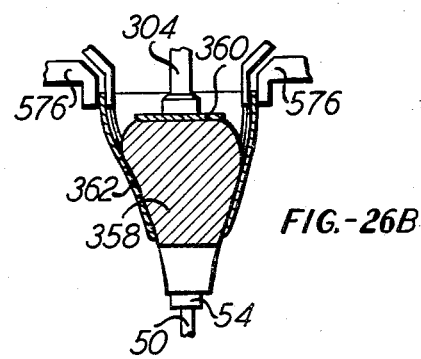

At the time that the motor 14 was actuated to raise the post 20, the margins of the upper 362 on the sides of the last moved between the open jaws of the pincers 576 at approximately the breast line of the shoe and last. Concomitantly with the actuation of the motor 192 by actuation of the pilot valve 494, air passes from the valve 494 through a line 594 to actuate the motors 578 to close the pincers 576 on the shoe upper at or near the breast line as indicated in FIGS. 26A and 26B.

Air can now pass from the valve 494 through a sequence valve 496 to actuate a pilot valve 498. Actuation of the pilot valve causes air to pass therethrough and through the lines 500 and 502 to the motors 212. Actuation of the motors 212 causes the piston rods 214 to move the levers 216 and the clamping pad 238 carried thereby toward the heel of the last with the slide 226 sliding in the gibs 234. During this movement the springs 228 and 230 maintain the lever legs 220 in abutting relation and the lever legs 222 in open position until the bight 504 engages the shoe as indicated in dotted lines in FIG. 27A. At this time the bight of the pad and the slide 226 can no longer move forwardly so that continued forward movement of the piston rods 214 causes the levers 216 to swing toward each other about the pivots 224 to cause the legs 506 of the pad to move toward each other and engage the shoe as indicated in solid lines in FIG. 27A. This arrangement provides for an initial contact of the pad 238 at the heel end of the shoe and then a progressive engagement of the pad along the sides of the shoe extending forwardly of the heel to ensure a smoothening out of any wrinkles there may be in the upper and a smooth, firm clamping of the upper against the last.

Figure 27A:
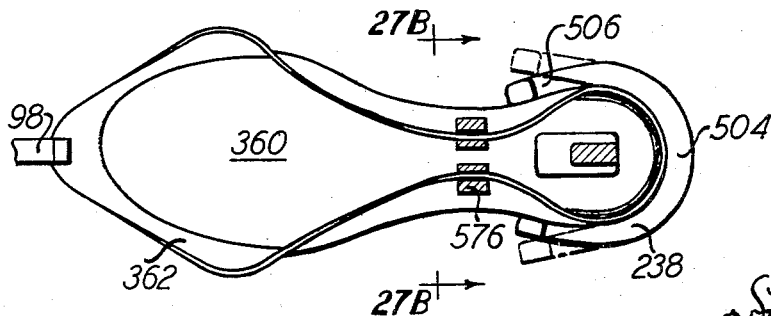
FIG. 27A is a plan view of the shoe and last after the breast line pincers have completed their inward movement and the heel of the upper has been clamped against the last.
Figure 27B:
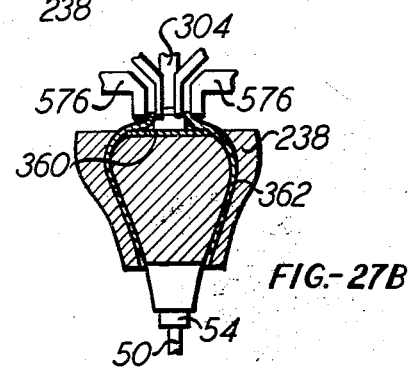
FIG. 27B is a view taken along the line 27B—27B of FIG. 27A.

Concomitantly with the actuation of the motors 212, air passes from the valve 498, through lines 500, 502 and 596 to the motors 562 to thereby actuate the motors 562 to move the pincers 576 toward each other over the insole and inwardly of its marginal edges to lay the upper margin at the breast line down on the insole as indicated in FIGS. 27A and 27B. At the same time, air passes from the valve 498 and lines 500, 502 and 598 to the pilot valve 592 to open the valve to atmosphere and enable the air in the motors 134 to be vented under the force of the springs in these motors to thereby open the jaws of forepart pincers 124.

The effect of the concurrent inward movement of the closed breast line pincers 576, the opening of the forepart pincers 124 and the clamping of the upper against the last by the clamping pad 238 is to cause the breast line pincers 576 to lay the upper down on the insole on the breast line so that the wipers 282 can effectively heel seat last without the upper fading away from the wipers. In addition the inward movement of the breast line pincers serves to apply further tension to the still flaccid counter 366 to augment the tension molding force initially applied by the horizontal stretching movement of the pincers 98 and 124 in molding the counter to the shape of the last. By opening the pincers 124 as the pincers 576 move inwardly, the pincers 576 do not have the opposing outwardly directed forces of the pincers 124 on the upper to contend with. The clamping pad 238 acts to provide a compression molding force on the counter to further mold it to the shape of the last as well as clamping the upper for the subsequent wiping operation.

Air now passes through a sequence valve 508 to actuate a three-way pilot valve 510 to allow air to pass through the valve 510 and a line 512 to the motors 248 to force the presser members 252 against the clamp pad 238 and thereby press the clamp pad against the shoe and last. As seen in FIG. 28, the presser members 252 engage the pad 238 towards the bottom of the pad opposite the portion of the last that curves inwardly to form a last portion having a relatively narrow width. The presser members 252 ensure that all of the clamping pad 238 bears against the last 358 to thereby hold the upper firmly in place during the subsequent lasting operation and to complete the molding of the counter 366 to the shape of the last.

Shortly after the actuation of the motors 248, air passes from the line 512 through a flow control valve 514 into the motor 256. Actuation of the motor 256 advances the piston rod 260, the rack 262 and the piston rod enlargement 276 to cause the wipers 282 to be moved from the dotted line position of FIG. 29B to the solid line position and wipe or fold the margin of the upper 362 and counter 366 down against the insole 360. During the wiper movement the portion of the upper margin gripped by the breast line pincers 576 slips between the pincers to the extent necessary for the wipers to wipe the upper margin flat against the insole. The wiping pressure completes the molding of the counter and causes the counter, through the adhesive on its surfaces, to bond the wiped-in margin of the upper to the insole. The forward movement of the piston rod 260, through the links 278, causes the wipers 282 to move toward each other about the point 286. The forward movement of the piston rod 260, through the rack 262, the pinion 264, the slot 272 and the pin 274 also causes the plate 268 to move forwardly thereby providing a forward movement of the wipers as well as an inward movement about the point 286. Since the slot 272 extends normal to the path of movement of the piston rod 260, the movement of the slot from the rightward position of FIG. 15 to the leftward position indicated in phantom causes the plate 268 initially to move forwardly almost as fast as the piston rod 260 and then to gradually slow down, until, towards the end of the stroke of the piston rod, the plate has substantially no forward movement. The result of this is that, initially, the wipers move forward with substantially no inward movement about the point 286, and at the end of the wiper stroke, the wipers move toward each other about the point 286 with very little forward movement. This produces a wiping action where the force created by the wipers in moving across the edge of the insole 360 at any given point is substantially radial to the curvature of the insole at that point.

During the forward stroke of the piston rod 260, the lug 289 actuates the three-way valve 292 to allow air to pass through the valve 292 to the motor 316. Actuation of the motor 316 moves the cam 320 forwardly to present the low cam portion 328 between the rollers 308, 310 and thus causes the raising of the hold-down foot 304 as indicated in FIG. 29A. The motor 14 now applies upward pressure by the last directly against the wipers to provide an overwiping and bedding pressure between the wipers and the wiped in margin of the upper during the latter part of the wiper stroke and also after the termination of the wiper stroke. At about this time, the heated counter has cooled sufficiently to become rigid in its molded shape, thereby causing the heel of the upper to assume a shape complementary to the heel of the last.

This includes the working phase in the machine cycle. The operator now releases his foot from the pedal 368. This causes air pressure to go through the valve 378 and the lines 394 and 461 to the motor 104 to open the pincers 98 and release the upper margin at the toe. At the same time air pressure goes through the lines 461 and 600 to the valve 592 to return the valve to its original position so that the valve will be in condition to pass air therethrough to the motors 134 during the next machine cycle. At the same time, air pressure passes through the line 461 to the motor 84 to actuate the motor 84 to lower the T-bar 88 and the pincers 98 and 124 to their initial position. At the same time, air pressure goes from the valve 378 and a line 516 to the motors 212 to actuate them to open the clamping pad 238, and to the motors 562 to cause them to move the breast line pincers 576 away from each other to their original position. At the same time, air passes through the line 516 to the motor 192 to return the heel seat lasting unit to its original out-of-the-way position, and from the line 516 through a line 602 to the motors 578 to open the jaws of the pincers 576. At the same time, air passes through the line 520 to the valve 488 to return it to its original *a* position which permits air to be vented from the motor 84 through the valve 488. At the same time, the valve 452 and the valve 458 are respectively caused by air pressure in a line 522 and the lines 467 and 524 to return to their original positions. The return of the valve 458 to its *a* position allows air pressure to pass through the line 526 into the motor 146 to move the piston 462 leftwardly (FIG. 6) against the pressure of the spring 357 to actuate the pilot valve 151 to operate the motors 64 to return the tensioning unit 68 to its original position on the bars 62. At the same time, air passing through a line 528 returns the valves 472 and 480 to their original positions.

Now a sequence valve 530 is actuated through a line 532 to actuate a pilot valve 534. Actuation of the pilot valve 534 causes air to pass therethrough to the motor 14 to cause the motor 14 to lower the post 20 and thereby lower the last and shoe. At the same time, air flows from the valve 534 to the motor 256 to actuate the motor 256 to retract the wipers 282. A the same time, air flows to the valve 510 through a line 536 to return the valve 510 to its original position. The return of the valve 510 to its original position allows the air in the motors 248 to be vented through the line 512 and the valve 510 to atmosphere and to cause the springs in these motors to return them to their original positions.

The retraction of the wipers by the rearward movement of the piston rod 260 causes the lug 289 to release the valve spool 290 and return the valve 292 to its original position and thereby allow the spring in the motor 316 to retract the piston rod 318, return the high cam portion 326 between the rollers 308 and 310 and lower the hold-down foot 304 to its original position.

Air can now pass through a sequence valve 538 to actuate a three-way pilot valve 540 to allow air to flow through the valve 540 and a line 542 to the motor 164 to cause the motor to raise the rack support 162 and thereby swing the post 20 away from the heel seat lasting unit 176 back to its original position. The raising of the rack support causes the lug 172 to move the valve 168 back to its original position.

It should be understood that the present disclosure is for the purpose of illustration only and that this invention includes all modifications and equivalents which fall within the scope of the appended claims. Terms such as above, below, forwardly and heightwise are merely indicative of the relative paths of movement and the relative positions of the machine parts and should be so construed.

I claim:

1. A method of heel seat lasting a shoe mounted bottom-up on a last, said shoe including an insole located on the last bottom and an upper mounted on the last, comprising: applying a pulling force on the upper by first stressing means to stretch the upper tightly about the heel of the last with the margin of the upper at the breast line and heel exending upwardly of the insole; gripping the margin on each side of the last proximate to the breast line by a second stressing means; laying substantial areas of the gripped breast line margin portions on the insole by moving the second stressing means toward each over the insole inwardly of the marginal edges of the insole in paths substantially parallel to the bottom of the insole; clamping the heel of the upper against the last; and wiping the upwardly extending margin at the heel down upon the insole.

2. A method of heel seat lasting a shoe mounted bottom-up on a last, said shoe including an insole located on the last bottom and an upper mounted on the last, comprising: gripping the margin of the upper at the toe and at the forepart on both sides of the last; applying a pulling force to said toe and forepart portions while they are gripped to stretch the upper tightly about the heel of the last with the margin of the upper at the breast line and heel extending upwardly of the insole; gripping the margin on both sides of the last proximate to the breast line; moving the gripped breast line portions toward each other and concomitantly releasing the upper at the forepart portions; clamping the heel of the upper against the last; and wiping the upwardly extending margin at the heel down upon the insole.

3. A method of counter molding and heel seat lasting a shoe mounted bottom-up on a last, said shoe including an insole located on the last bottom, an upper mounted on the last and a flaccid, moldable counter interposed between the upper and last at the heel of the last, comprising: applying a pulling force on the upper by first stressing means to stretch the upper tightly about the heel of the last with the margin of the upper at the heel and breast line extending upwardly of the insole and to initiate the tension molding of the counter to the shape of the last; gripping the margin of the upper on each side of the last proximate to the breast line by a second stressing means; laying substantial areas of the gripped breast line margin portions on the insole at the breast line and further tension molding the counter to the shape of the last by moving the second stressing means toward each other over the insole inwardly of the marginal edges of the insole in paths susbtantially parallel to the bottom of the insole; clamping the heel of the upper against the last to compression mold the counter to the shape of the last and to hold the upper against movement on the last; and wiping the upwardly extending margin at the heel down upon the insole.

4. A method of counter molding and heel seat lasting a shoe mounted bottom-up on a last, said shoe including an insole located on the last bottom, an upper mounted on the last and a flaccid, moldable counter interposed between the upper and last at the heel of the last, comprising: gripping the margin of the upper at the toe and at the forepart on both sides of the last; applying a pulling force to said toe and forepart portions while they are gripped to stretch the upper tightly about the heel of the last with the margin of the upper at the breast line and heel extending upwardly of the insole and to initiate the tension molding of the counter to the shape of the last; gripping the upper margin on both sides of the last proximate to the breast line; moving the gripped breast line portions of the upper toward each other and concomitantly releasing the upper at the forepart portions to further tension mold the counter to the shape of the last and to lay the upper on the insole at the breast line; clamping the heel of the upper against the last to compression mold the counter to the shape of the last and to hold the upper against movement on the last; and wiping the upwardly extending margin at the heel down upon the insole.

5. A heel seat lasting machine comprising: wiping means mounted for forward movement; heel clamping means located below the wiping means; a shoe support located forwardly of the wiping and clamping means for supporting bottom-up a last having an insole located on its bottom and an upper mounted thereon; upper vamp gripping means located forwardly of the wiping and clamping means and above the shoe support; breast line gripping means located above the shoe support on each side of the shoe support intermediate the wiping and clamping means and the vamp gripping means; means for actuating the vamp gripping means to grip the vamp of the upper and exert a pulling force on the upper to stretch the upper tightly about the heel of the last with the margin of the upper at the breast line and heel extending upwardly of the insole; means for actuating the breast line gripping means to grip the margin of the upper proximate the breast line; means for moving the breast line gripping means toward each other; means for actuating the clamping means to clamp the heel of the upper against the last; and means for effecting forward movement of the wiping means to wipe the upwardly extending upper margin at the heel of the upper down upon the insole.

6. A heel seat lasting machine comprising: wiping means mounted for forward movement; heel clamping means located below the wiping means; a shoe support located forwardly of the wiping and clamping means for supporting bottom-up a last having an insole located on its bottom and an upper mounted thereon; toe gripping means located forwardly of the wiping and clamping means and above the shoe support; forepart gripping means located above the shoe support on each side of the shoe support intermediate the toe gripping means and the wiping and clamping means; breast line gripping means located above the shoe support on each side of the shoe support intermediate the forepart gripping means and the wiping and clamping means; means for actuating the toe gripping means and forepart gripping means to respectively grip the toe and forepart portions of the upper and exert a pulling force on the upper to stretch the upper tightly about the heel of the last with the margin of the upper at the breast line and heel extending upwardly of the insole; means for actuating the breast line gripping means to grip the margin of the upper proximate the breast line; means for moving the breast line gripping means toward each other and for concomitantly causing the forepart gripping means to release the upper; means for actuating the clamping means to clamp the heel of the upper against the last; and means for effecting forward movement of the wiping means to wipe the upwardly extending upper margin at the heel of the upper down upon the insole.

7. A heel seat lasting machine comprising: wiping means mounted for forward movement in a predetermined plane; a shoe support, mounted for heightwise movement, located forwardly of the wiping means for supporting bottom-up a last having an insole located on its bottom and an upper mounted thereon with the upper margin at the heel and breast line extending upwardly of the insole; a breast line pincers located above the shoe support on each side of the shoe support and forwardly of the wiping means, each of said pincers having a pair of normally open jaws; means for initially locating the shoe support so that the insole is below the bottom of the wiping means and each of the upper margin breast line portions is directly below the open jaws of a breast line pincers; means for thereafter raising the shoe support to bring the insole to a level slightly below the bottom of the wiping means and to bring each of the upper margin breast line portions between the open jaws of a breast line pincers; means for thereafter closing the jaws of each of the breast line pincers to thereby grip the breast line portions of the upper; means for thereafter moving the pincers toward each other; and means for effecting forward movement of the wiping means, after the closing of said jaws and no earlier than concomitantly with the movement of said pincers toward each other to wipe the upwardly extending margin at the heel of the upper down upon the insole.

8. A heel seat lasting machine comprising: wiping means mounted for forward movement in a predetermined plane; heel clamping means located below the wiping means; a shoe support, mounted for heightwise movement, located forwardly of the wiping and clamping means for supporting bottom-up a last having an insole located on its bottom and an upper mounted thereon with the upper margin at the heel and breast line portions extending upwardly of the insole; a breast line pincers located above the shoe support on each side of the shoe support and forwardly of the wiping and clamping means, each of said pincers having a pair of normally open jaws; means for initially locating the shoe support so that the insole is below the bottom of the wiping means and each of the upper margin breast line portions is directly below the open jaws of a breast line pincers; means for thereafter raising the shoe support to bring the insole to a level slightly below the bottom of the wiping means and to bring each of the upper margin breast line portions between the open jaws of a breast line pincers; means for thereafter closing the jaws of each of the breast line pincers to thereby grip the breast line portions of the upper; means for thereafter moving the breast line pincers toward each other; and means for effecting forward movement of the wiping means after the closing of said jaws and no earlier than concomitantly with the movement of said pincers toward each other, to wipe the upwardly extending margin at the heel of the upper down upon the insole.

9. A heel seat lasting machine comprising: wiping means mounted for forward movement in a predetermined plane; heel clamping means located below the wiping means; a shoe support, mounted for heightwise movement, located forwardly of the wiping and clamping means for supporting bottom-up a last having an insole located on its bottom and an upper mounted thereon; upper vamp gripping means located forwardly of the wiping and clamping means and above the shoe support; a breast line pincers located above the shoe support on each side of the shoe support and intermediate the wiping and clamping means and the vamp gripping means, each of said breast line pincers having a pair of normally open jaws; means for actuating the vamp gripping means to grip the vamp of the upper and exert a pulling force on the upper to stretch the upper tightly about the heel of the last with the margin of the upper at the breast line and heel extending upwardly of the insole; means for raising the shoe support to bring the insole to a level slightly below the bottom of the wiping means and to bring each of the upper margin breast line portions between the open jaws of a breast line pincers; means for closing the jaws of each of the breast line pincers to thereby grip the breast line portions of the upper; means for moving the breast line pincers toward each other; means for actuating the clamping means to clamp the heel of the upper against the last; and means for effecting forward movement of the wiping means to wipe the upwardly extending upper margin at the heel of the upper down upon the insole.

10. A heel seat lasting machine comprising: wiping means mounted for forward movement in a predetermined plane; heel clamping means located below the wiping means; a shoe support, mounted for heightwise movement, located forwardly of the wiping and clamping means for supporting bottom-up a last having an insole located on its bottom and an upper mounted thereon; toe gripping means located forwardly of the wiping and clamping means and above the shoe support; forepart gripping means located above the shoe support on each side of the shoe support intermediate the toe gripping means and the wiping and clamping means; a breast line pincers located above the shoe support on each side of the shoe support intermediate the forepart gripping means and the wiping and clamping means, each of said breast line pincers having a pair of normally open jaws; means for actuating the toe gripping means and forepart gripping means to respectively grip the toe and forepart portions of the upper and exert a pulling force on the upper to stretch the upper tightly about the heel of the last with the margin of the upper at the breast line and heel extending upwardly of the insole; means for raising the shoe support to bring the insole to a level slightly below the bottom of the wiping means and to bring each of the upper margin breast line portions between the jaws of a breast line pincers; means for closing the jaws of each of the breast line pincers to thereby grip the breast line portions of the upper; means for moving the breast line pincers toward each other and for concomitantly causing the forepart gripping means to release the upper; means for actuating the clamping means to clamp the heel of the upper against the last; and means for effecting forward movement of the wiping means to wipe the upwardly extending upper margin at the heel of the upper down upon the insole.

11. A heel seat lasting machine comprising: wiping means movable forwardly in a predetermined plane; a hold-down located forwardly of the wiping means; a shoe support, for supporting bottom-up a last having a shoe upper and insole thereon, located below the hold-down and forwardly of the wiping means; gripping means mounted on the shoe support for gripping the margin of the upper proximate to its toe end; a breast line pincers located above the shoe support on each side of the shoe support intermediate the gripping means and the wiping means, each of said breast line pincers having a pair of normally open jaws; means for moving the gripping means forwardly to stretch the upper about the heel of the last with the margin of the upper at the breast line and heel extending upwardly of the insole; means for raising the shoe support to clamp the last and shoe between the shoe support and hold-down and to bring each of the upper breast line portions between the jaws of a breast line pincers; means for raising the gripping means to stretch the upper tightly on the last; means for closing the jaws of each of the breast line pincers to thereby grip the breast line portions of the upper; means for moving the breast line pincers toward each other; and means to move the wiping means forwardly to wipe the upper margin at the heel of the upper down upon the insole.

12. A heel seat lasting machine comprising: wiping means movable forwardly in a predetermined plane; heel clamping means located below the wiping means; a hold-down, positioned forwardly of the wiping and clamping means, comprising a foot whose bottom is located slightly below the bottom of the wiping means; a shoe support, for supporting bottom-up a last having a shoe upper and insole thereon, mounted for movement toward and away from the wiping means and heel clamping means; gripping means mounted on the shoe support for gripping the margin of the upper proximate to its toe end; a breast line pincers located above the shoe support on each side of the shoe support intermediate the gripping means and the wiping and clamping means, each of said breast line pincers having a pair of normally open jaws; means for moving the gripping means forwardly of the shoe support to stretch the upper about the heel of the last with the margin of the upper at the breast line and heel extending upwardly of the insole; means for moving the shoe support from a position remote from the wiping and heel clamping means to a position adjacent thereto; means for raising the shoe support to clamp the last and shoe between the shoe support and hold-down and to bring each of the upper breast line portions between the jaws of a breast line pincers; means for raising the gripping means upwardly of the shoe support to stretch the upper tightly on the last; means for closing the jaws of each of the breast line pincers to thereby grip the breast line portions of the upper; means for moving the breast line pincers toward each other; means to actuate the clamping means to clamp the heel of the upper against the last; and means to move the wiping means forwardly to wipe the upper margin down upon the insole.

13. A heel seat lasting machine comprising: wiping means movable forwardly in a predetermined plane; heel clamping means located below the wiping means; a hold-down, positioned forwardly of the wiping and clamping means, comprising a foot whose bottom is located slightly below the bottom of the wiping means; a shoe support, for supporting bottom-up a last having a shoe upper and insole thereon, pivotally mounted on a rod for swinging movement toward and away from the wiping and heel clamping means; gripping means mounted on the shoe support for gripping the margin of the upper proximate to its toe end; a breast line pincers located above the shoe support on each side of the shoe support intermediate the gripping means and the wiping and clamping means, each of said breast line pincers having a pair of normally open jaws; means for moving the gripping means forwardly of the shoe support to stretch the upper about the heel of the last with the margin of the upper at the breast line and heel extending upwardly of the insole; means for swinging the shoe support about the rod from a position remote from the wiping and heel clamping means to a position adjacent thereto; means for raising the rod to thereby raise the shoe support to clamp the last and shoe between the shoe support and hold-down and to bring each of the upper breast line portions between the jaws of a breast line pincers; means for raising the gripping means upwardly of the shoe support to stretch the upper tightly on the last; means for closing the jaws of the breast line pincers to thereby grip the breast line portions of the upper; means for moving the breast line pincers toward each other; means to actuate the clamping means to clamp the heel of the upper against the last; and means to move the wiping means forwardly to wipe the upper margin down upon the insole.

14. A heel seat lasting machine comprising: a frame; a lasting unit slidably mounted in the frame for forward and rearward movement from an out-of-the-way position to a working position, said lasting unit comprising wiping means movable forwardly in a predetermined plane and heel clamping means located below the wiping means; a hold-down unit mounted in the frame, said hold-down unit comprising a hold-down foot whose bottom is normally located slightly below the bottom of the wiping means; a shoe support, for supporting bottom-up a last having a shoe upper and insole thereon, pivotally mounted on a rod for swinging movement toward and away from the lasting unit; powered means connected to said rod to effect heightwise movement of the rod and shoe support; toe gripping means mounted on the shoe support and located forwardly of the wiping and clamping means; forepart gripping means mounted on the shoe support and located on each side of the shoe support intermediate the toe gripping means and the wiping and clamping means; a breast line pincers located above the shoe support on each side of the shoe support intermediate the forepart gripping means and the wiping and clamping means, each of said breast line pincers having a pair of normally open jaws; means for moving the toe and forepart gripping means forwardly of the shoe support to stretch the upper tightly about the heel of the last with the margin of the upper at the breast line and heel extending upwardly of the insole; means for swinging the shoe support about the rod from a position remote from the lasting unit and hold-down unit to a position adjacent thereto; means for actuating the powered means to raise the shoe support to thereby clamp the last and shoe between the shoe support and the hold-down foot and to bring each of the upper breast line portions between the jaws of a breast line pincers; means for raising the toe and forepart gripping means upwardly of the shoe support to stretch the upper tightly on the last; means for moving the lasting unit forwardly from its out-of-the-way position to its working position and for concomitantly closing the jaws of the breast line pincers to thereby grip the breast line portions of the upper; means for moving the breast line pincers toward each other and for concomitantly causing the forepart gripping means to release the upper; means to actuate the clamping means to clamp the heel of the upper against the last; means to move the wiping means forwardly across the insole to wipe the upper margin at the heel of the upper down upon the insole; and means operative concomitantly with the forward movement of the wiping means to raise the hold-down foot and cause the powered means to press the wiped upper margin against the bottom of the wiping menas.

15. A method of heel seat lasting a shoe mounted bottom-up on a last, said shoe including an insole located on the last bottom and an upper mounted on the last, comprising: applying a pulling force on the upper by first stressing means to stretch the upper tightly about the heel of the last with the margin of the upper at the breast line and heel extending upwardly of the insole; gripping the margin on each side of the last proximate to the breast line by a second stressing means; laying substantial areas of the gripped breast line margin portions on the insole by moving the second stressing means toward each other over the insole and inwardly of the marginal edges of the insole in paths substantially parallel to the bottom of the insole; and wiping the upwardly extending margin at the heel down upon the insole.

16. A method of counter molding and heel seat lasting a shoe mounted bottom-up on a last, said shoe including an insole located on the last bottom, an upper mounted on the last and a flaccid, moldable counter interposed between the upper and last at the heel of the last, comprising: applying a pulling force on the upper by first stressing means to stretch the upper tightly about the heel of the last with the margin of the upper at the heel and breast line extending upwardly of the insole and to initiate the molding of the counter to the shape of the last; gripping the margin of the upper on each side of the last proximate to the breast line by a second stressing means; laying substantial areas of the gripped breast line margin portions on the insole at the breast line and further molding the counter to the shape of the last by moving the second stressing means toward each other over the insole inwardly of the marginal edges of the insole in paths substantially parallel to the bottom of the insole and wiping the upwardly extending margin at the heel down upon the insole.

17. A method of heel seat lasting a shoe mounted bottom-up on a last, said shoe including an insole located on the last bottom and an upper mounted on the last, comprising: gripping the margin of the upper at the toe and at the forepart on both sides of the last; applying a pulling force to said toe and forepart portions while they are gripped to stretch the upper tightly about the heel of the last with the margin of the upper at the breast line and heel extending upwardly of the insole; gripping the margin of the upper on both sides of the last proximate to the breast line; moving the gripped breast line portions toward each other and concomitantly releasing the upper at the forepart portions; and wiping the upwardly extending margin at the heel down upon the insole.

18. A method of counter molding and heel seat lasting a shoe mounted bottom-up on a last, said shoe including an insole located on the last bottom, an upper mounted on the last and a flaccid, moldable counter interposed between the upper and last at the heel of the last, comprising: gripping the margin of the upper at the toe and at the forepart on both sides of the last; applying a pulling force to said toe and forepart portions while they are gripped to stretch the upper tightly about the heel of the last with the margin of the upper at the breast line and heel extending upwardly of the insole and to initiate the molding of the counter to the shape of the last; gripping the upper margin on both sides of the last proximate to the breast line; moving the gripped breast line portions toward each other and concomitantly releasing the upper at the forepart portions to further mold the counter to the shape of the last and to lay the upper on the insole at the breast line; and wiping the upwardly extending margin at the heel down upon the insole.

19. A heel seat lasting machine comprising: wiping means mounted for forward movement; a shoe support located forwardly of the wiping means for supporting bottom-up a last having an insole located on its bottom and an upper mounted thereon; upper vamp gripping means located forwardly of the wiping means and above the shoe support; breast line gripping means located above the shoe support on each side of the shoe support intermediate the wiping means and the vamp gripping means; means for actuating the vamp gripping means to grip the vamp of the upper and exert a pulling force on the upper to stretch the upper tightly about the heel of the last with the margin of the upper at the breast line and heel extending upwardly of the insole; means for thereafter actuating the breast line gripping means to grip the margin of the upper proximate the breast line; means for thereafter moving the breast line gripping means toward each other; and means for effecting forward movement of the wiping means, after the actuation of the breast line gripping means to grip the said margin and no earlier than concomitantly with the movement of the breast line gripping means toward each other, to wipe the upwardly extending margin at the heel of the upper down upon the insole.

20. A heel seat lasting machine comprising: wiping means mounted for forward movement; a shoe support located forwardly of the wiping means for supporting bottom-up a last having an insole located on its bottom and an upper mounted thereon; toe gripping means located forwardly of the wiping means and above the shoe support; forepart gripping means located above the shoe support on each side of the shoe support intermediate the toe gripping means and the wiping means; breast line gripping means located above the shoe support on each side of the shoe support intermediate the forepart gripping means and the wiping means; means for actuating the toe gripping means and the forepart gripping means to respectively grip the toe and forepart portions of the upper and exert a pulling force on the upper to stretch the upper tightly about the heel of the last with the margin of the upper at the breast line and heel extending upwardly of the insole; means for actuating the breast line gripping means to grip the margin of the upper proximate the breast line; means for moving the breast line gripping means toward each other and for concomitantly causing the forepart grippers to release the upper; and means for effecting forward movement of the wiping means to wipe the upwardly extending margin at the heel of the upper down upon the insole.

21. A heel seat lasting machine comprising: wiping means mounted for forward movement in a predetermined plane; a shoe support, mounted for heightwise movement, located forwardly of the wiping means for supporting bottom-up a last having an insole located on its bottom and an upper mounted thereon; upper vamp gripping means located forwardly of the wiping means and above the shoe support; a breast line pincers located above the shoe support on each side of the shoe support intermediate the wiping means and the vamp gripping means, each of said pincers having a pair of normally open jaws; means for actuating the vamp gripping means to grip the vamp of the upper and exert a pulling force on the upper to stretch the upper tightly about the heel of the last with the margin of the upper at the breast line and heel extending upwardly of the insole; means for raising the shoe support to bring the insole to a level slightly below the bottom of the wiping means and to bring each of the upper margin breast line portions between the open jaws of a breast line pincers; means for closing the jaws of each of the breast line pincers to thereby grip the breast line portions of the upper; means for moving the breast line pincers toward each other; and means for effecting forward movement of the wiping means to wipe the upwardly extending margin at the heel of the upper down upon the insole.

22. A heel seat lasting machine comprising: wiping means mounted for forward movement in a predetermined plane; a shoe support, mounted for heightwise movement, located forwardly of the wiping means for supporting bottom-up a last having an insole located on its bottom and an upper mounted thereon; toe gripping means located forwardly of the wiping means and above the shoe support; forepart gripping means located above the shoe support on each side of the shoe support intermediate the toe gripping means and the wiping means; a breast line pincers located above the shoe support on each side of the shoe support intermediate the wiping means and the forepart gripping means, each of said pincers having a pair of normally open jaws; means for actuating the toe gripping means and the forepart gripping means to respectively grip the toe and forepart portions of the upper and exert a pulling force on the upper to stretch the upper tightly about the heel of the last with the margin of the upper at the breast line and heel extending upwardly of the insole; means for raising the shoe support to bring the insole to a level slightly below the level of the wiping means and to bring each of the upper breast line portions between the open jaws of a breast line pincers; means for closing the jaws of each of the breast line pincers to thereby grip the breast line portion of the upper; means for moving the breast line pincers toward each other and for concomitantly causing the forepart pincers to release the upper; and means for effecting forward movement of the wiping means to wipe the upwardly extending margin at the heel of the upper down upon the insole.

23. The method according to claim 2 wherein the said gripped breast line portions are moved toward each other over the insole inwardly of the marginal edges of the insole in paths substantially parallel to the bottom of the insole.

24. The method according to claim 4 wherein said gripped breast line portions are moved toward each other over the insole inwardly of the marginal edges of the insole in paths substantially parallel to the bottom of the insole.

25. The method according to claim 17 wherein the gripped breast line portions are moved toward each other over the insole inwardly of the marginal edges of the insole in paths substantially parallel to the bottom of the insole.

26. The method according to claim 18 wherein the gripped breast line portions are moved toward each other over the insole inwardly of the marginal edges of the insole in paths substantially parallel to the bottom of the insole.

References Cited in the file of this patent

UNITED STATES PATENTS

| | | |
|---|---|---|
| 1,197,438 | Brock | Sept. 5, 1916 |
| 1,274,590 | Pym | Aug. 6, 1918 |
| 1,913,445 | Holmgren | June 13, 1933 |
| 2,010,092 | Lawson | Aug. 6, 1935 |
| 2,180,234 | Haber et al. | Nov. 14, 1939 |
| 2,210,586 | Kamborian | Aug. 6, 1940 |
| 2,254,224 | Kamborian | Sept. 2, 1941 |
| 2,611,195 | Braply et al. | Sept. 23, 1952 |
| 2,614,275 | Jorgensen | Oct. 21, 1952 |
| 2,723,468 | Marcy | Nov. 15, 1955 |
| 2,740,138 | Quinn | Apr. 3, 1956 |
| 2,754,529 | Robinson | July 17, 1956 |
| 3,038,182 | Woodman | June 12, 1962 |

FOREIGN PATENTS

| | | |
|---|---|---|
| 9,845 | Denmark | July 9, 1907 |